United States Patent
Loo

(10) Patent No.: US 9,231,946 B2
(45) Date of Patent: Jan. 5, 2016

(54) MOBILE CLOUD SERVICE ARCHITECTURE

(71) Applicant: Oracle International Corporation, Redwood Shores, CA (US)

(72) Inventor: Kaj van de Loo, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/475,285

(22) Filed: Sep. 2, 2014

(65) Prior Publication Data

US 2015/0229638 A1    Aug. 13, 2015

Related U.S. Application Data

(60) Provisional application No. 61/937,316, filed on Feb. 7, 2014.

(51) Int. Cl.
*H04L 29/06* (2006.01)
*G06Q 10/10* (2012.01)

(52) U.S. Cl.
CPC ............ *H04L 63/0853* (2013.01); *G06Q 10/10* (2013.01); *H04L 63/029* (2013.01); *H04L 63/10* (2013.01)

(58) Field of Classification Search
CPC .... H04L 63/029; H04L 63/10; H04L 63/0853
See application file for complete search history.

(56) References Cited

U.S. PATENT DOCUMENTS 6,751,671 B1 *  6/2004  Urien ............................ 709/229
6,970,935 B1 * 11/2005  Maes ............................ 709/230

(Continued)

FOREIGN PATENT DOCUMENTS

EP         2849061 A1 *  3/2015
WO    2013/071087 A1      5/2013

(Continued)

OTHER PUBLICATIONS

Chanliau, Marc, "Securing SOA and Web Services with Oracle Enterprise Gateway", http://www.oracle.com/, Apr. 30, 2011 [retrieved on Nov. 10, 2014]. Retrieved from the Internet: <URL:http://www.oracle.com/technetwork/middleware/id-mgmt/oeg-tech-wp-apr-2011-345875.pdf>, 22 pages.

(Continued)

*Primary Examiner* — Eleni Shiferaw
*Assistant Examiner* — Nelson Giddins
(74) *Attorney, Agent, or Firm* — Kilpatrick Townsend & Stockton LLP

(57) ABSTRACT

Techniques are described for implementing a cloud computer system to facilitate communication between a computing device (e.g., a mobile computing device) and enterprise computer systems. In certain embodiments, the cloud computer system may receive, from a computing device, a request for a service provided by an enterprise computer system. The cloud computer system may determine security authentication of a user for the requested service. A security protocol may be determined for a requested enterprise computer system and a security token may be generated for the request according to the determined security protocol. The request may be sent to the requested enterprise computer system. In some embodiments, security authentication for a request to an enterprise computer system may be determined based on previous authentication. The cloud computer system may be configured to communicate with several different enterprise computer systems according to their supported protocols (e.g., communication protocol and/or security protocol).

17 Claims, 7 Drawing Sheets

(56) References Cited

U.S. PATENT DOCUMENTS

| | | | |
|---|---|---|---|
| 8,504,837 B2 * | 8/2013 | Jasper et al. | 713/172 |
| 9,043,600 B2 * | 5/2015 | Jasper et al. | 713/172 |
| 2003/0187631 A1 * | 10/2003 | Masushige et al. | 703/27 |
| 2004/0107196 A1 * | 6/2004 | Chen et al. | 707/4 |
| 2004/0162823 A1 * | 8/2004 | van de Loo et al. | 707/4 |
| 2006/0206348 A1 * | 9/2006 | Chen et al. | 705/1 |
| 2008/0010676 A1 * | 1/2008 | Dosa Racz et al. | 726/11 |
| 2009/0158302 A1 * | 6/2009 | Nicodemus et al. | 719/328 |
| 2009/0170557 A1 * | 7/2009 | Chauhan et al. | 455/552.1 |
| 2012/0155470 A1 * | 6/2012 | McNamee et al. | 370/392 |
| 2012/0158872 A1 * | 6/2012 | McNamee et al. | 709/206 |
| 2012/0158993 A1 * | 6/2012 | McNamee et al. | 709/238 |
| 2012/0158994 A1 * | 6/2012 | McNamee et al. | 709/238 |
| 2012/0158995 A1 * | 6/2012 | McNamee et al. | 709/238 |
| 2013/0086210 A1 | 4/2013 | Yiu et al. | |
| 2013/0086211 A1 * | 4/2013 | Sondhi et al. | 709/217 |
| 2013/0219176 A1 * | 8/2013 | Akella et al. | 713/165 |
| 2014/0181864 A1 * | 6/2014 | Marshall et al. | 725/38 |
| 2015/0082385 A1 * | 3/2015 | Maria | 726/3 |
| 2015/0130365 A1 * | 5/2015 | Kim et al. | 315/209 R |
| 2015/0227405 A1 | 8/2015 | Jan et al. | |
| 2015/0227406 A1 | 8/2015 | Jan et al. | |
| 2015/0229645 A1 | 8/2015 | Keith et al. | |
| 2015/0278245 A1 | 10/2015 | Sagar et al. | |

FOREIGN PATENT DOCUMENTS

| | | | |
|---|---|---|---|
| WO | WO 2013071087 A1 * | 5/2013 | |
| WO | WO 2013086211 A2 * | 6/2013 | |
| WO | WO 2015038225 A1 * | 3/2015 | |
| WO | WO 2015042547 A1 * | 3/2015 | |
| WO | WO 2015050568 A1 * | 4/2015 | |
| WO | 2015119529 | 8/2015 | |
| WO | 2015119658 | 8/2015 | |
| WO | 2015119659 | 8/2015 | |

OTHER PUBLICATIONS

International Search Report and Written Opinion mailed Nov. 25, 2014 for Int'l Patent Application No. PCT/US2014/053747, 17 pages.

Facemire, Michael, et al., "Cloud Mobile Development: Enabled by Back-End-As-A-Service, Mobile's New Middleware," Aug. 30, 2012 (updated Sep. 5, 2012), Forrester Research, Inc., Cambridge, MA, 15 pages.

* cited by examiner

MOBILE CLOUD SERVICE ARCHITECTURE

CROSS-REFERENCES TO RELATED APPLICATIONS

The present application claims priority and benefit from U.S. Provisional Application No. 61/937,316, filed Feb. 7, 2014, entitled "MOBILE CLOUD SERVICE (MCS)," the entire contents of which are incorporated herein by reference for all purposes.

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to the field of computer infrastructure. Specifically presented are techniques for facilitating communication between a mobile computing device and enterprise computer systems via a cloud computer system.

BACKGROUND

Companies are striving to find ways to connect electronic mobile devices to their enterprise computer systems. This is so that on-the-go employees can access information remotely from where the information is stored on enterprise computer systems. Thus, employees can manage their information no matter where they might be—as if they were at the office. Such capabilities can allow salespeople to work from the road, service technicians to look up parts while at a customer site, and other employees to work from home.

Similarly, some companies would like to allow end customers to access data from their enterprise computer systems, which are often times implemented using back-end computer systems. Such access may differentiate a company from its competitors, improve the customer experience, and lower costs for the company. For example, certain stores can allow a customer to search store inventory for an item of merchandise. This type of self-service improves the customer experience by allowing him or her to shop on his or her own terms at odd times of day, as well as lowers the need for salespeople, operators, and other staff.

Mobile device applications, commonly referred to as "apps," are present on many smart phones and other electronic mobile communication devices. Depending on a type of app or the type of data used by an app, an app may need to connect and synchronize with different enterprise computer systems. Many enterprise computer systems may be supported by different back-end computer systems, which can vary for the application and the type of data. As such, different back-end enterprise systems may use different communication protocols and mechanisms to communicate data to devices. As such, different mobile computing devices running a variety of apps may encounter challenges for communicating with different back-end computer systems supporting an enterprise computer system.

In addition to the challenges in enabling communication between an app and a specific enterprise computing systems, security may become a major concern in allowing access to an enterprise's internal computer system. The differences in communication protocols supported between the mobile computing devices and the enterprise computer systems may further complicate managing security access for communications between mobile computing devices and enterprise computer systems. Different mechanisms may be implemented to ensure authentication of an application to access a particular enterprise computer system according to a proprietary security protocol. Some have attempted to address such compatibility issues for security by connecting off-the-shelf consumer mobile devices with companies' back-end enterprise systems. These devices may be configured with applications or operating systems configured to connect to an enterprise's network through special portals dedicated to communicate with back-end computer systems supporting an enterprise computer system.

Manufacturers of mobile devices, application developers, and enterprises' may benefit from more flexible and robust techniques for connecting mobile devices to an enterprise's back-end computer systems.

BRIEF SUMMARY

Techniques are described for implementing a cloud computer system to facilitate communication between a computing device (e.g., a mobile computing device) and enterprise computer systems. In certain embodiments, the cloud computer system may receive, from a computing device, a request for a service provided by an enterprise computer system. The cloud computer system may determine security authentication of a user for the requested service. A security protocol may be determined for a requested enterprise computer system and a security token may be generated for the request according to the determined security protocol. The request may be sent to the requested enterprise computer system. In some embodiments, security authentication for a request to an enterprise computer system may be determined based on previous authentication. The cloud computer system may be configured to communicate with several different enterprise computer systems according to their supported protocols (e.g., communication protocol and/or security protocol).

In certain embodiments, the cloud computer system may provide one or more callable interfaces to receive requests from a computing device. The requests may be received according to one format (e.g., a standard, a style, a protocol, or the like) supported by the callable interface. The cloud computer system may convert or translate a request to another format (e.g., a standard, a style, a protocol, or the like) supported by the requested enterprise computer system. The formats may be different. In some embodiments, an enterprise computer system may include an agent computing system located on-premises of an enterprise. The agent computing system may be configured to communicate with the cloud computer system. The agent computing system may translate or convert and/or direct requests to back-end servers according to a protocol or standard supported by those back-end servers.

According to at least one example, techniques may be provided for facilitating communication between a mobile computing device and enterprise computer systems. Such techniques may be implemented by a computer system (e.g., a cloud computer system). The computer system may include one or more processors and one or more memory devices coupled with and readable by one or more processors. For example, the computing system may include a cloud server computer. The one or more memory devices may store a set of instructions which, when executed by the one or more processors, cause the one or more processors to perform the techniques disclosed herein. The techniques can include a computer-implemented method. The method may include receiving, by a cloud computer system, from a mobile computing device, a request for a service from an enterprise computer system. In certain embodiments, the request received from the mobile computing device and the request sent to the enterprise computer system may conform to different representational state transfer (REST) architectural styles. In certain embodiments, the request received from the mobile computing device includes a first hypertext transfer protocol (HTTP) message and wherein the request sent to the enterprise computer system includes a second HTTP message. In certain embodiments, the request may include user identity information of the user. The cloud computer system may be located at a first geographical location that is different from a second geographical location of the enterprise computer system. The cloud computer system and the enterprise computer system may communicate over a public communication network. The method may further include obtaining for a user of the mobile computing device associated with the request, a security authentication to obtain at least one service through the cloud computer system. The method may include sending a request to an identity management system to determine the security authentication of the user. The method may further include storing information indicating the security authentication. The method may further include identifying, based on the security authentication of the user, a plurality of enterprise computer systems accessible to the user through the cloud computer system. In certain embodiments, at least one of the plurality of enterprise computer systems may communicate using a different security protocol than a different one of the plurality of enterprise computer systems. The method may further include verifying that the enterprise computer system is included in the plurality of enterprise computer systems accessible to the user. In certain embodiments, the plurality of enterprise computer systems may include an enterprise computer system having an on-premises agent system. The on-premises agent system may include a plurality of server computers, each server computer providing a different enterprise service. The on-premises agent system may communicate with the cloud computer system over the public communication network. In certain embodiments, the cloud computer system provides an application programming interface (API). The API may use a first communication protocol to receive requests for services. The API may be configurable by a user of the mobile computing device. In certain embodiments, the cloud computer system includes a database that stores metadata corresponding to one or more configurations of the API. Each enterprise computer system of the plurality of enterprise computer systems may use a second communication protocol to receive requests for services. The second communication protocol may be different from the first communication protocol. In certain embodiments, the first communication protocol and the second communication protocol conform to a HTTP. In certain embodiments, each enterprise computer system of the plurality of enterprise computer systems supports a different second communication protocol for receiving requests for services. In certain embodiments, the method may include converting the request from a format of the first communication protocol to a different format corresponding to the second communication protocol. The converted request may be sent to the enterprise computer system. The method may further include determining a security protocol for requesting the service from the enterprise computer system. The method may further include generating a security token corresponding to the determined security protocol for the enterprise computer system. The security token may be generated based on the information indicating the security authentication of the user. In certain embodiments, the security token may be structured in a format using Security Assertion Markup Language (SAML). The method may further include sending to the enterprise computer system, a request for the requested service. The request may include the generated security token. In certain embodiments, the method may include: receiving, from the enterprise computer system, a response for the requested service; converting the response from the format of the second communication protocol to a format of the first communication protocol; and providing the converted response to the mobile computing device. The response may have a format of the second communication protocol of the enterprise computer system.

According to at least one example, a cloud computer system is provided for facilitating communication between a mobile computing device and enterprise computer systems. The cloud computer system may include: one or more processors; one or more memory devices coupled with and readable by the one or more processors; a communication module, a protocol translator, and security service. The communication module may receive, from a mobile computing device using a first communication protocol, a request for a service, where the service is provided by an enterprise computer system, where the enterprise computer system is located at a first geographical location that is different from a second geographical location of the computer system, and where the computer system and the enterprise computer system communicate over a public communication network. The communication module may send, to the enterprise computer system, the request for the service using a second communication protocol, where the second communication protocol is different from the first communication protocol. The communication module may receive, from the enterprise computer system via the second communication protocol, a response to the request for the service. The communication module may send the received response to the mobile computing device. The protocol translator may convert the request received from the mobile computing device, where the request is converted from a first format of the first communication protocol to a second format of the second communication protocol. The protocol translator may convert the response received from the enterprise computer system, where the response is converted from the second format of the second communication protocol to the first format of the first communication protocol, and where the converted response is sent as the response to the mobile computing device. The security service may obtain for a user of the mobile computing device associated with the request, a security authentication to obtain at least one service through the cloud computer system. The security service may store information indicating the security authentication. The security service may identify, based on the security authentication of the user, a plurality of enterprise computer systems accessible to the user through the cloud computer system. The security service may verify that the enterprise computer system is included in the plurality of enterprise computer systems accessible to the user. The security service may determine a security protocol for requesting the service from the enterprise computer system. The security service may generate a security token corresponding to the determined security protocol for enterprise computer system, where the security token is generated based on the information indicating the security authentication of the user, and where the generated security token is included in the request sent to the enterprise computer system.

According to at least one example, a cloud computer system is provided to facilitate communication between a mobile computing device and an on-premises enterprise computer system. The cloud computer system may include a cloud computer device configured to: receive, through an application programming interface (API), from a mobile computing device, HTTP messages conforming to a first architectural style; and generate and send, to the agent, HTTP messages conforming to a second architectural style. The cloud computer system may include a firewall connected with the cloud computer device, where an internal network and an external network are separated by the firewall, and where the firewall is configured to: permit communication of HTTP messages, conforming to the first architectural style, between the mobile computing device and the cloud computing device; and permit communication of HTTP messages, conforming to the second architectural style, between the cloud computer device and the agent. The cloud computer system may include a metadata repository connected with the cloud computer device, where the metadata repository is configured to store metadata for implementing the API, the implementing including translating between the first architectural style and the second architectural style, and where the metadata repository is modifiable by an authenticated user via the external network.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The following detailed description together with the accompanying drawings will provide a better understanding of the nature and advantages of the present invention.

BRIEF DESCRIPTION OF THE DRAWINGS

Illustrative embodiments of the present invention are described in detail below with reference to the following drawing figures.

DETAILED DESCRIPTION

Figure 1:
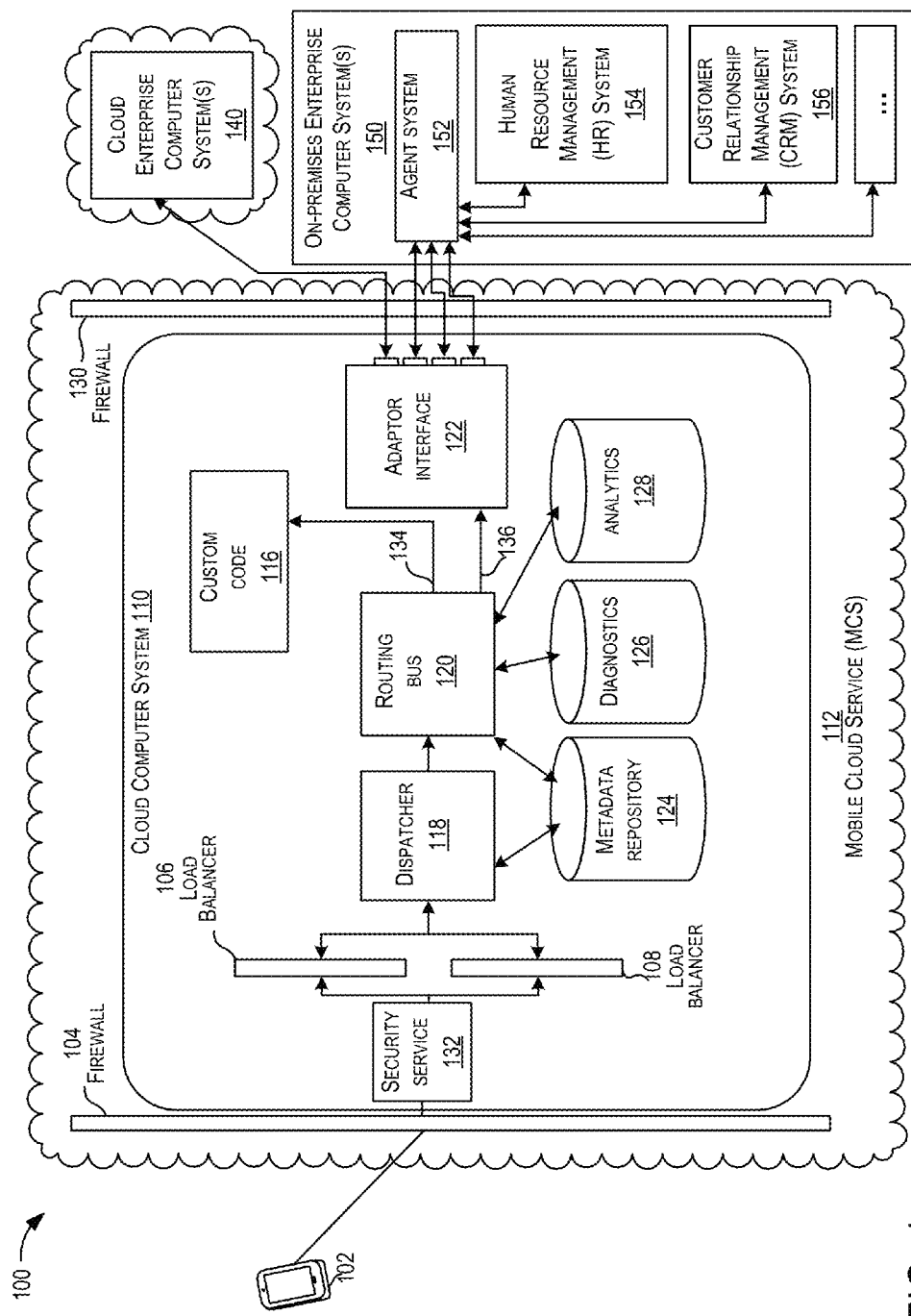
FIG. 1 shows a block diagram of a computing environment to facilitate communication between a mobile computing device and enterprise computer systems according to some embodiments of the present invention.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computer system.

Techniques are described for implementing a cloud computer system to facilitate communication between a computing device (e.g., a mobile computing device) and enterprise computer systems. In certain embodiments, the cloud computer system may receive, from a computing device, a request for a service provided by an enterprise computer system. The cloud computer system may determine security authentication of a user for the requested service. A security protocol may be determined for a requested enterprise computer system and a security token may be generated for the request according to the determined security protocol. The request may be sent to the requested enterprise computer system. In some embodiments, security authentication for a request to an enterprise computer system may be determined based on previous authentication. The cloud computer system may be configured to communicate with several different enterprise computer systems according to their supported protocols (e.g., communication protocol and/or security protocol).

In certain embodiments, the cloud computer system may provide one or more callable interfaces to receive requests from a computing device. The requests may be received according to one format (e.g., a standard, a style, a protocol, or the like) supported by the callable interface. The cloud computer system may convert or translate a request to another format (e.g., a standard, a style, a protocol, or the like) supported by the requested enterprise computer system. The formats may be different. In some embodiments, an enterprise computer system may include an agent computing system located on-premises of an enterprise. The agent computing system may be configured to communicate with the cloud computer system. The agent computing system may translate or convert and/or direct requests to back-end servers according to a protocol or standard supported by those back-end servers.

FIG. 1 shows a block diagram of a computing environment 100 for facilitating communication between a mobile computing device and enterprise computer systems according to some embodiments of the present invention. For purposes of illustration, various examples are provided herein to describe techniques for enabling a mobile computing device (e.g., computing device 102) to communicate with one or more enterprise computer systems, such as a cloud enterprise computer system 140 (e.g., "serviceprovider.com") and an on-premises enterprise computer system 150. Such communications may be to exchange or transfer enterprise data, request services provides by an enterprise computer system, communicate messages, or combinations thereof.

Messages may include service invocation messages, result messages, request messages, other messages communicated internally, other messages communicated between a computing device and an enterprise computer system, or combinations thereof. A message may include a message type (e.g., a type value from a set of shared type constants), a correlation id (e.g., an id used to correlate this message with one or more other messages), priority information to support for priority based message queues, timeout, sensitivity indicator to support message data isolation, message source (e.g., a uniform resource identifier of a sender), a message destination (e.g., a uniform resource identifier that uniquely identifies the destination, a request context (e.g., request information from dispatcher), and/or a message payload. The payload may have different attributes depending upon the type of message that is being sent, such as parameter data and result data.

Enterprise data as described herein may include data received from an enterprise computer system, data sent to an enterprise computer system, data processed by an enterprise computer system, or combinations thereof. The enterprise data may be distinguishable from data for consumer applications and/or services. In some embodiments, for example, enterprise data may change based on application or use of the enterprise data, whereas data for consumer applications (e.g., consumer data) may remain static through use. In certain embodiments, enterprise data may include or be associated with rules that indicate criteria for storing, using, and/or managing the enterprise data. For example, enterprise data may be associated with policy information that indicates one or more policies for storing, using, and/or managing the enterprise data. In certain embodiments, policy information may be included in enterprise data. In certain embodiments, enterprise data may include data processed, stored, used, or communicated by an application or a service executing in an enterprise computer system. For example, enterprise data may include business data (e.g., business objects) such as JSON (JavaScript Object Notation) formatted data from enterprise applications, structured data (e.g., key value pairs), unstructured data (e.g., internal data processed or used by an application, data in JSON format, social posts, conversation streams, activity feeds, etc.), binary large objects (BLOBs), documents, system folders (e.g., application related folders in a sandbox environment), data using representational state transfer (REST) techniques (referred to herein as "RESTful data") (e.g., synchronization data made available by REST endpoints), system data, configuration data, synchronization data, or combinations thereof. In some embodiments, enterprise data may include REST-formatted enterprise data. REST-formatted enterprise data may include RESTful data. REST-formatted data may include data formatted according to REST techniques implemented by an enterprise computer system. Configuration or synchronization data may include data used for synchronization of enterprise data, such as versions, history, integration data, etc. Documents in enterprise data may include extended markup language (XML) files, visual assets, configuration files, media assets, etc. A BLOB may include a collection of binary data stored as a single entity in a database management system, such as an image, multimedia object, or executable code, or as otherwise known in the art.

An enterprise computer system may include various computing systems that are configured to operate for an entity or an enterprise. For example, an enterprise computer system may include one or more computer systems, such as an enterprise server computer (e.g., a back-end server computer), to handle requests for services. An enterprise computer system may include applications and/or services, which can process and/or operate using enterprise data. For example, enterprise computer system 150 may provide one or more services and/or applications for managing or operating an enterprise. Services may include, without restriction, customer relationship management (CRM), human capital management (HCM), human resource (HR) management, supply chain management, enterprise communication, email communication, business services, other enterprise management services or applications, or combinations thereof. Enterprise computer system 150 may include one or more computer systems dedicated to providing one or more services. In some embodiments, each different computer system providing a service may be located on-premise of an enterprise or may be located remotely from an enterprise. In some embodiments, multiple different computer systems supporting different services may be situated in a single geographical location, such as on-premises of an enterprise. In the example shown in FIG. 1, on-premises enterprise computer system 150 may include an HR system 154 and a CRM system 156, both of which may be located on-premises of an enterprise. In some embodiments, enterprise computer system 140 may include or implement an agent system 152 to facilitate or handle communication between cloud computer system 110 and one or more enterprise systems 154, 156. Enterprise computer systems, such as cloud enterprise computer system 140 and on-premises enterprise computer system 150 are described below in further detail.

The computer environment 100 may include a mobile cloud service ("MCS") 112 implemented to operate as a secure intermediary computing environment that may facilitate communication between the computing device 102 and one or more enterprise computer systems because computing device 102 may not be configured to communicate with such enterprise computer systems. For example, some enterprise computer systems may be supported by legacy or back-end computer systems. Such systems may be configured to operate using different communication and/or security protocols. The protocols supported by such enterprise computer systems may be different from those supported by mobile computing devices. MCS 112 may support communication with different types of mobile computing devices. As such, MCS 112 may implement techniques to facilitate communication between enterprise computer systems and mobile computing devices to enable them to communicate with each other despite their incompatibilities in communication, such as differences between formats or communication protocols. For example, MCS 112 may translate communication protocols between mobile computing devices and enterprise computer systems.

Cloud computer system 110 may support MCS 112. Cloud computer system 110 may be implemented using hardware, software, firmware, or combinations thereof. For example, cloud computer system 110 may include one or more computing devices, such as a server computer. Cloud computer system 110 may include one or more memory storage devices and one or more processors. A memory storage device can be accessible to the processor(s) and can include instructions stored thereon which, when executed by the processor(s), cause the processor(s) to implement one or more operations disclosed herein. In some embodiments, the memory storage devices may operate as local storage (e.g., cache). Cloud computer system 110 may include different kinds of operating systems. A memory storage device may be accessible to the processor(s) and may include instructions stored thereon which, when executed by the processor(s), cause the processor(s) to implement one or more operations, methods, or processes disclosed herein. The memory storage may operate as local storage. Local storage may be implemented using any type of persistent storage device, such as a memory storage device or other computer-readable storage medium. In some embodiments, local storage may include or implement one or more databases (e.g., a document database, a relational database, or other type of database), one or more file stores, one or more file systems, or combinations thereof. The local storage may store enterprise data.

In certain embodiments, cloud computer system 110 may include one or more data stores, such as a metadata repository 124, diagnostics store 126, and an analytics store 128. The data stores 124, 126, 128 may be accessible by any component in cloud computer system 110.

Metadata repository 124 may store all the metadata associated with MCS 112. This information may be composed of both run-time and design-time data, each having their own requirements on availability and performance. A tenant or subscriber of MCS 112 may have any number of applications. Each application may be versioned and may have an associated zero or more versioned resource APIs and zero or more versioned services implementations those resource application programming interface (API) contracts. These entities are what the run-time uses to map virtual requests (mAPIs) to the concrete service implementation (service). This mapping provides a mobile developer with the luxury of not having to know the actual implementation service when she designs and builds her application. As well as not requiring her to have to republish a new application on every service bug fix. Metadata repository 124 may store one or more callable interfaces, which may be invoked by a computing device (e.g., computing device 102). The callable interfaces may be customizable by a user (e.g., a developer) of an application to facilitate communication with MCS 112. Metadata repository 124 may store metadata corresponding to one or more configurations of a callable interface. Metadata repository 124 may be configured to store metadata for implementing a callable interface. The callable interface may be implemented to translate between a one format, protocol, or architectural style for communication and another format, protocol, or architectural style for communication. Metadata repository 124 may be modifiable by an authenticated user via the external network.

Diagnostics store 126 may store diagnostics information about processing occurring in MCS 112. Diagnostics store 126 may store messages communicated via MCS 112 and log information. Analytics store 128 may store logging and analytics data captured during processing in the system.

On behalf of MCS 112, cloud computer system 110 may utilize its computing resources to enable execution of custom code 116 (e.g., operations, applications, methods, functions, routines, or the like). Computing resources may be allocated for use with respect to a particular user associated as a subscriber or tenant to MCS 112. Resources may be allocated with respect to a user, a device, an application, or other criterion related to a subscriber. MCS 112 may be scaled in or out, depending on the demand of mobile computing devices seeking to communicate with enterprise computer systems. MCS 112 can be configured such that it is elastic to handle surges and temporary periods of higher than normal traffic between mobile computing devices and enterprise computer systems. In some embodiments, MCS 112 may include elements that support scalability such that components may be added or replaced to satisfy demand in communication.

Computing device 102 may communicate (e.g., send a request message) with MCS 112 to request service provided by an enterprise computer system. Computing device 102 (e.g., a mobile computing device) may be implemented using hardware, firmware, software, or combinations thereof. Computing device 102 may communicate with enterprise computer systems 140, 150 via MCS 112. Computing device 102 may include or may be implemented as an endpoint device, a personal digital assistant (PDA), a tablet computer, a laptop computer, a mobile computing device, a desktop computer, a wearable computer, a pager, etc. Computing device 102 may include one or more memory storage devices and one or more processors. Computing device 102 may include different kinds of operating systems. A memory storage device may be accessible to the processor(s) and may include instructions stored thereon which, when executed by the processor(s), cause the processor(s) to implement one or more operations, methods, or processes disclosed herein. The memory storage may operate as local storage. Local storage may be implemented using any type of persistent storage device, such as a memory storage device or other computer-readable storage medium. In some embodiments, local storage may include or implement one or more databases (e.g., a document database, a relational database, or other type of database), one or more file stores, one or more file systems, or combinations thereof. The local storage may store enterprise data.

In various embodiments, computing device 102 may be configured to execute and operate one or more applications such as a web browser, a client application, a proprietary client application, or the like. The applications can include specific applications configured for enterprise data and/or services provided by an enterprise computer system. Client applications may be accessible or operated via one or more network(s). Applications may include a graphical user interface (GUI) for operating the application.

Computing device 102 may communicate with MCS 112 via one or more communication networks using wireless communication. Examples of communication networks may include a mobile network, a wireless network, a cellular network, a local area network (LAN), a wide area network (WAN), other wireless communication networks, or combinations thereof. In certain embodiments, computing device 102 may establish a communication connection 114 with MCS 112 using a custom communication protocol (e.g., a custom protocol). Connection 114 may be established with MCS 112 through cloud computer system 110. The custom protocol may be an HTTP-based protocol. By utilizing a custom communication protocol, computing device 102 may operate on any computing device platform to communicate with cloud computer system 110.

Computing device 102 may communicate with cloud computer system 110 through one or more callable interfaces, e.g., application programming interfaces (APIs). A callable interface may be implemented on computing device 102. The callable interface may be implemented for custom applications that enable those applications to communicate with MCS 112. In some embodiments, a callable interface may be developed for MCS 112. The callable interface may enable applications to communicate with MCS 112 without having to adapt to differences in protocols (e.g., communication or development protocols) and/or architectural styles or formats.

MCS 112 may be protected by one or more firewalls 104, 130 to provide a secure environment to process requests and execute custom code 116. Communication between computing device 102 and MCS 112 may be separated by an external communication firewall 104. Firewall 104 may be connected with cloud computer system 110 to facilitate secure access to MCS 112. Firewall 104 may permit communication of messages between cloud computer system 110 and computing devices (e.g., computing device 102). Such messages (e.g., HTTP messages or REST messages) may conform to a communication protocol (e.g., HTTP or REST), which may be supported by a callable interface. In another example, a message between cloud computer system 110 and computing device 102 may conform to a communication protocol such as Speedy (SPDY). MCS 112 may manage firewall 130 to secure communication between cloud computer system 110 and enterprise computer systems 140, 150. Firewall 130 may permit communication of messages between cloud computer system 110 and computing devices (e.g., computing device 102). Such messages (e.g., SPDY messages, HTTP messages or REST messages) may conform to a communication protocol (e.g., SPDY, HTTP, or REST). Communication between computing device 102 and enterprise computer systems 140, 150 may be two-way via MCS 112.

Because communication with computing device 102 and enterprise computer systems 140, 150 may occur via an unsecure, public network, firewalls 104, 130 provide an added layer of protection for communications to and from MCS 112. Firewalls 104, 130 may enable MCS 112 to distinguish its internal network from an external network connecting computing device 102 and enterprise computer systems 140, 150. In some embodiments, firewalls 104, 130, although shown as two distinct firewalls, may be implemented as a single firewall that encapsulates MCS 112.

Cloud computer system 110 may further operate as an intermediary computing environment by communicating with enterprise computer systems, some of which may have different communication protocols. Such communication protocols may be custom or specific to an application or service in communication with cloud computer system 110. Further, cloud computer system 110 may communicate with an enterprise computer system to provide enterprise services and/or to exchange enterprise data according to a format supported by the enterprise computer system. Cloud computer system 110 may maintain local storage (e.g., local cache) of enterprise data and may use the local storage to manage synchronization of the enterprise data between mobile computing devices and enterprise computer systems 140, 150.

Computing device 102 may communicate (e.g., send a request message) with MCS 112 to request service provided by an enterprise computer system. Requests that are received through firewall 104 may be processed first by security service 132. Security service 132 may manage security authentication for a user associated with a request. Thus, a cloud computer system may provide technical advantages that include providing security mechanisms described herein which may protect the integrity of customer communications and enterprise data. Technical advantages of cloud computer system may include preventing or reducing compromised communications and/or data from being compromised, authentication may occur initially, restricting access to only those who have the required credentials. Technical advantages of cloud computer system may include the services and service invocation flow being structured such that as requests come in they may only be able to access services for which they are authorized. By decoupling authorization from the rest of the system processing, another technical advantage may include the task of authorizing "what can be done by whom" being delegated to a dedicated provisioned security subsystem (e.g., an identity management system) that may be expanded to support whatever additional custom security measures are required by a specific corporate customer. In some embodiments, security authentication may be determined for a request, a session, a user, a device, other criterion related to the user, or combinations thereof. Security authentication may be performed for each request that is received. In some embodiments, security service 132 may determine authentication based on a previous verification of a request. Security authentication may be determined for a user or a device such that requests to different enterprise computer systems 140, 150 may be authenticated based on a single verification of security.

Further technical advantages of the invention may include a cloud computer system enabling a computing device to communicate with various enterprise computer systems, some of which may be implemented differently. For example, a computing device 302, cloud computer system 110, and enterprise computer system 150 may be located at different geographical locations, physically separated from each other. Therefore, computing device 302 can communicate with enterprise computer system 150 regardless of their location. Technical advantages may include a cloud computer system enabling a computing device to communicate requests for services to enterprise computer systems, which may support one or more distinct security protocols. In some cases, an enterprise computer system may be supported by a back-end system that is not easily adaptable to a different security protocol. In some cases, it may be desirable for developers of applications to be able to implement an application to be able to request services without knowledge of such security protocols. It may be equally desirable for a user (e.g., an administrator or an architect) of an enterprise computer system to be able to receive requests without accommodating for different types of applications, security protocols, and standards. Technical advantages may enable such desires to be met by implementation of a cloud computer system, as described herein, which can handle security authentication, such that requests can meet the security measures of different enterprise computer systems that are being requested.

In some embodiments, security service 132 may determine a security protocol for a requested enterprise computer system and accordingly generate a security token according to such security protocol. The security token may be passed along with a request to an enterprise computer system to enable that enterprise computer system to verify authentication based on the generated security token. Enterprise computer systems may support different security protocols. A security protocol may be a standard by which security is determined. Security may be verified based on a security token that is generated by security service 132. Security service 132 may determine a security protocol for an enterprise computer system identified for a request. In some embodiments, an enterprise computer system 150 may have an agent system 152, which may be configured or implemented according to a custom or specific security protocol supported by MCS 112. As such, MCS 112 may generate a security token according to such custom security protocol. Security service is described below with reference to FIGS. 2 and 3.

Cloud computer system 110 may include, implement, and/or communicate with one or more load balancer systems 106, 108. Upon determining security authentication, cloud computer system 110 may request any one of load balancer systems 106, 108 to examine a request that it receives and to detect which service the request is directed to. MCS 112 may be configured with load balancers 106, 108 and updated with resources that get started up, so that when a request comes in, load balancers 106, 108 can balance a requested load across the different resources.

Cloud computer system 110 may include a dispatcher 118 that may handle requests and dispatch them to the appropriate service. A request may be routed to an appropriate service upon dispatch. In some embodiments, a service itself may route an internal request to another internal service in MCS 112 or in an enterprise computer system. In some embodiments, dispatcher 1180 may resolve a request to determine its destination based on a location (e.g., an address) of a destination identified in a uniform resource identifier (URI) and/or a uniform resource locator (URL) of the request. Dispatcher 118 may parse a request and its header to extract one or more of the following information: tenant identifier, service identifier, application name, application version, request resource, operation and parameters, etc. Dispatcher 118 can use the parsed information to perform a lookup in metadata repository 124. Dispatcher 118 may retrieve a corresponding application metadata. Dispatcher 118 may determine the target service based on the requested resource and the mappings in the metadata. While initially a very basic mapping, the metadata can be enhanced to provide for more sophisticated, rules-based dispatching. Dispatcher 118 may perform any dispatcher-specific logging, metrics gathering, etc. Dispatcher 118 may then perform initial authorization according to the application metadata. Dispatcher 118 may format the inbound request and any other necessary information and place the message on routing bus 120 for further processing. Dispatcher 118 may place a request on a queue and await the corresponding response. Dispatcher 118 may process responses received from routing bus 120 and return a response to computing device 102.

In addition to handling the dispatching for external requests, dispatcher 118 may also play a role in dispatching internal requests. Such internal requests can come in the form of composite services or custom code invocations to services. In both cases, the caller could use a logical service name as defined within the application. Dispatcher 118 may use the current execution context to determine the application and use that logical name to determine the appropriate service to invoke.

Cloud computer system 110 may include a routing bus 120 to manage deliver of messages to destinations registered with routing bus 120. Routing bus 120 may operate as a central system for managing communications in cloud service 112. Data communicated through routing bus 120 may be processed to capture and store the data. Routing bus 120 may provide a framework so that additional centralized services (additional authorization, debugging, etc.) can be plugged in easily as necessary. Data captured by routing bus 120 may be stored in diagnostics store 126 and/or analytics store 128.

Routing bus 120 may route messages to one or more destinations. In some embodiments, a message may include a request to execute custom code 116. In such embodiments, routing bus 120 may request 134 custom code 116 to be invoked. In some embodiments, routing bus 120 may pass on a request to a destination enterprise computer system identified by information in a request. Routing bus 120 may request 136 an adaptor interface 122 to perform translations, if necessary, to pass a request to an enterprise computer system, e.g., enterprise computer system 140 or enterprise computer system 150.

In certain embodiments, cloud computer system 110 may include or implement adaptor interface 122 to translate or convert a message to a protocol supported by a receiving enterprise computer system. Adaptor interface 122 may establish separate communication connections with each of enterprise computer systems 140, 150. Cloud computer system 110 may be configured to communicate with enterprise computer systems 140, 150 via one or more networks (not shown). Examples of communication networks may include the Internet, a mobile network, a public network, a wireless network, a cellular network, a local area network (LAN), a wide area network (WAN), other communication networks, or combinations thereof. In certain embodiments, communication connections may be high-speed communication connections facilitated using high-speed communication trunks. Communication with an enterprise computer system 140, 150 may pass through firewall 130 which ensures that communication with an external network is secure to prevent unauthorized access to MCS 112 via such communications.

In some embodiments, cloud computer system 110 may facilitate notifications to a user of computing device 102. Cloud computer system 110 may include an alert management service that supports stateful interaction with a user, for example to deliver an alert based on user preferences through one or more channels, wait for a response, and take action based on the response. Responses to an alert sent on one channel may be received through another channel, which the service needs to be able to handle. The platform may come with built-in state models for popular interaction patterns and be extensible with new state models. Some alert channels may include known communication resources, either one-way or two-way. Examples include SMS, Twitter®, push notifications, and Google Cloud Messaging®.

In some embodiments, cloud computer system 110 may enable computing device to access and/or request one or more services, such as an object store service, database service, access web services, social services, resource services, or combinations thereof.

Cloud computer system 110 may provide an object store service that may provide a storage facility for BLOBs. The basic unit of storage can be text, with read and write operations. A basic query facility for JSON objects may also be offered.

Cloud computer system 110 may provide a database service to allow for connectivity to hosted databases for performing queries or writes. Required parameterization may require the full connection string for the database, the SQL string or stored procedure to execute, any parameters and possibly credentials. The necessary information can be provided at run time or be pre-configured in the application metadata.

Cloud computer system 110 may provide access to web services such as Simple Access Object Protocol (SOAP) web services. Cloud computer system 110 may provide access to REST services, such as connectivity to arbitrary REST resources.

Cloud computer system 110 may provide access to social services that may provide basic integration with many of the popular social sites such as Facebook®, Twitter®, etc. These services may allow for third party authentication using the user's credentials from those sites as well as access to their services. Examples include sending a tweet or updating your status.

Cloud computer system 110 may provide an public cloud service to enable a user to simplify and optimize communication. For example, a service developer may use the generic web service of MCS 112 to talk to a resource hosted using cloud computer system's 110 cloud service.

A cloud computer system, such as one described herein, may enable mobile computing devices to communicate with enterprise computer system despite differences in computing resources. A cloud computer system may be equipped with more resources and a faster, more reliable connection to enterprise computer systems to communicate frequently to receive enterprise data. The cloud computer system may manage and coordinate requests for services from enterprise computer systems. By translating requests to a protocol supported by a recipient of a message, the cloud computer system reduces a burden on developers to configure applications for communication with different types of back-end computer systems. Enterprises are able to maintain their back-end systems without having to accommodate advances or changes in communication protocols supported for mobile devices. Different enterprise computer systems may support different security protocols based on a type of requests processed and services provided. By managing security authentication in a centralized manner for access to different enterprise computer systems, enterprise computer systems do not need to adapt to differences in security protocols. By authenticating a user of the cloud computer system, processing requests can become more efficient as authentication may not be performed in every instance.

Figure 2:
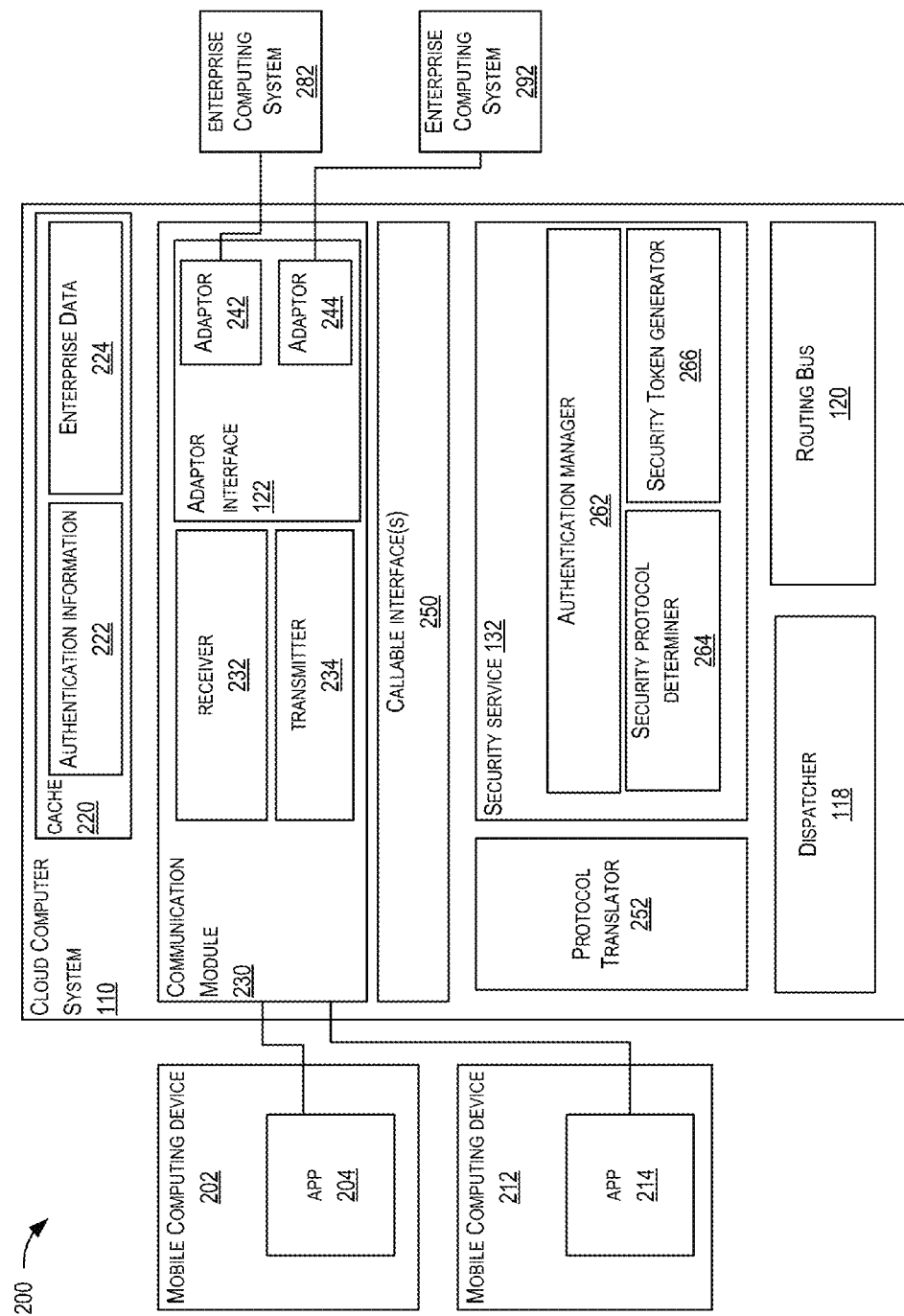
FIG. 2 shows a block diagram of a computing environment to facilitate communication between a mobile computing device and enterprise computer systems according to some embodiments of the present invention.

Now turning to FIG. 2, a block diagram is shown of a computing environment 200 that may facilitate communication between a mobile computing device and enterprise computer systems according to some embodiments of the present invention. Computing environment 200 may include cloud computer system 110. In certain embodiments, cloud computer system 110 may be implemented as one or more functional blocks or modules configured to perform various operations for facilitating communication between computing devices (e.g., mobile computing device 202 and mobile computing device 212) and enterprise computer systems (e.g., enterprise computer system 282 and enterprise computer system 292). Cloud computer system 110 may include communication module 230, callable interface 250, security service 132, dispatcher 118, routing bus 120, and protocol translator 252.

Cloud computer system 110 may include one or more memory storage devices ("local storage"), such as cache 220. Cache 220 may be used to store enterprise data 224 and authentication information 222. Enterprise data 224 may be received from enterprise computer systems 282, 292 or from mobile computing devices 202, 212, or may include enterprise data converted by cloud computer system 110, or combinations thereof. Authentication information 222 may be received from an identity management system and/or generated by cloud computer system 110. In some embodiments, authentication information 222 may include information indicating security authentication of a user with regard to a request for a service.

Communication module 230 may be configured to manage communications between cloud computer system 110 and multiple enterprise computer systems, e.g., enterprise computer systems 282, 292. To facilitate communication, communication module 230 may be equipped with hardware to enable communication, such as a receiver 232 and a transmitter 234, or a combination thereof.

Enterprise computer systems, such as enterprise computer systems 282, 292, may be physically located beyond a firewall (e.g., firewall 130) of cloud computer system 110 at a different geographic location (e.g., remote geographic location) than cloud computer system 110. In some embodiments, enterprise computer system 282 may be different from enterprise computer system 292. In some embodiments, enterprise computer system 282 and enterprise computer system 292 may be part of a single computer system. Each of enterprise computer systems 282, 292 may communicate with cloud computer system 110 using a different communication protocols. Enterprise computer system 282 and enterprise computer system 292 may support the same or different security protocols. In some embodiments, enterprise computer system 282 and/or enterprise computer system 292 may be implemented as enterprise computer system 150, which may include an agent system (e.g., agent system 152), to handle communication with multiple enterprise computer systems. In some embodiments, communication module 230 may be configured to send and receive communications through a firewall such as firewall 104 and/or firewall 130.

In certain embodiments, one or more of enterprise computer systems 282, 292 may communicate with cloud computer system 110 using one or more different protocols. A protocol may include a communication protocol, such as SPDY. A protocol may include an application protocol such as an HTTP-based protocol. In some embodiments, enterprise computer systems 282, 292 may communicate with cloud computer system 110 using a REST or SOAP communication protocols. For example, REST protocol may support a formats including URI or URL. Enterprise Data formatted for communication using REST protocol may be easily converted to data formats such as JSON, comma-separated values (CSV), and really simple syndication (RSS). Enterprise computer systems 282, 292 and cloud computer system 110 may communicate using other protocols such as remote procedure calls (RPC) (e.g., XML RPC).

In some embodiments, cloud computer system 110 and enterprise computer systems 282, 292 may communicate using communication connections that support high-speed communication. Communication module 230 may maintain high-speed communication connections, which may enable cloud computer system 110 to maintain on going and multiple communications with enterprise computer systems 282, 292 for managing and/or synchronizing communication to exchange enterprise data or deliver requested services. The high-speed communication connections may afford cloud computer system 110 the ability to handle multiple communications with enterprise computer systems to fully synchronize enterprise data, whereas a mobile computing device may be limited in bandwidth of a wireless communication connection to constantly receive enterprise data. The communication connection between cloud computer system 110 and an enterprise computer system may be reliable such that cloud computer system 110 may receive and send communications to synchronize enterprise data with little or no interruption.

In some embodiments, communication module 230 may include an adaptor interface 122 configured to support communication with enterprise computer systems, some of which may support different protocols or techniques for communications. Adaptor interface 122 may include one or more adaptors, e.g., adaptor 242 or adaptor 244, each of which may be configured to communicate according to a communication protocol, a type of enterprise computer system, a type of application, a type of service, or combinations thereof. A communication protocol supported by an adaptor may be specific to one or more enterprise computer systems. For example, communication module 230 may include an adaptor 242 configured for communication with enterprise computer system 282 using a specific protocol supported by enterprise computer system 282. In another example, communication module 230 may include an adaptor 244 configured for communication with enterprise computer system 292 using a specific protocol supported by enterprise computer system 292. Adaptor interface 122 may establish separate communication connections with each of enterprise computer systems 282, 292. In some embodiments, adaptor interface 122 may be configured to communicate with an agent system (e.g., agent system 152), which may be included or implemented by an enterprise computer system. An adaptor in adaptor interface 122 may be configured to communicate according to a custom protocol used for communication with an agent system. The custom protocol may be specific to a type of agent system or an enterprise computer system in which an agent system supports. The adaptor interface may reduce or eliminate a need for an app, e.g., app 204 or app 214, to be developed specifically to support communication with a particular enterprise computer system.

Cloud computer system 110 may use communication module 230 to communicate with mobile computing devices, e.g., mobile computing devices 202, 212. Mobile computing devices may be situated in a different geographical location than cloud computer system 110. For example, mobile computing devices 202, 212 may be physically located beyond a firewall (e.g., firewall 104) of cloud computer system 110 at a different geographic location (e.g., remote geographic location) than cloud computer system 110. Each of mobile computing devices 202, 212 may communicate with cloud computer system 110 using a different communication protocol. In certain embodiments, one or more of mobile computing devices 202, 212 may communicate with cloud computer system 110 using one or more different protocols. A protocol may include a communication protocol, such as SPDY. A protocol may include an application protocol such as an HTTP-based protocol. In some embodiments, communication module 230 may communicate with mobile computing devices using a custom communication protocol. The custom communication protocol may be an HTTP-based communication protocol. The communication protocol used for communication between mobile computing devices 202, 212 may support communication of enterprise data structured in different formats (e.g., JSON format), which may be easily readable by mobile computing devices 202, 212 and cloud computer system 110.

In certain embodiments, mobile computing devices 202, 212 may each implement an application (an "app") that can provide specific user interfaces to communicate with cloud computer system 110. A specific UI may be configured to communicate using a specific communication protocol. In some embodiments, specific UIs may include callable interfaces, functions, routines, methods, and/or operations that may be invoked to communicate with cloud computer system 110. Specific UIs may accept as input parameters for communicating with enterprise computer systems for enterprise data and/or to request a service. In some embodiments, communication through apps 204, 214 may be converted for communication using a custom communication protocol. In certain embodiments, specific UIs may be included or implemented by synchronization manager 110. In some embodiments, specific UIs may correspond to a custom client in an application.

Cloud computer system 110 may include one or more callable interfaces 250, e.g., an application programming interface (API). Callable interface 250 may enable an app on a mobile computing device to communicate requests to MCS 112. Callable interface 250 may support a common or standard interface, which may allow requests including their parameters to be received from apps according to a standardized protocol, architectural style, and/or format (e.g., a REST protocol). Callable interface 250 may be configurable by a user of any one of computing devices 202, 212. Callable interface 250 may receive requests for services according to a communication protocol. For example, callable interface 250 may be a REST API that supports requests according to a REST protocol. In some embodiments, callable interface 250 may receive messages from mobile computing devices. Callable interface 250 may be configured to translate or convert messages received from mobile computing devices according to a format supported by callable interface 250. Device application developers can connect to MCS 112 for their custom applications. In some embodiments, a callable interface 250 may be configured by the same person that develops an app, such that the person can implement a custom app to communicate with MCS 112.

Callable interface 250 may enable enterprise computer systems to communicate with MCS 112 according to a standardized protocol or format. Similar to application developers, those who manage enterprise computer systems can implement code (e.g., an agent system) that is configured to communicate with MCS 112 via callable interface 250. Callable interfaces 250 may be implemented based on a type of a computing device, a type of enterprise computer systems, an app, an agent system, a service, a protocol, or other criterion. In some embodiments, callable interface 250 may support requests for services including authentication, compression, encryption, pagination with cursors, client-based throttling, non-repudiation, logging, and metrics collection. In some embodiments, callable interface 250 may be implemented for custom business-related services, such as authentication, policy enforcement, caching of responses, throttling of calls to MCS 112, translation between asynchronous and synchronous patterns, logging of calls to underlying services, or combinations thereof. In some embodiments, callable interface 250 may enable users to load custom code (e.g., custom code 116) for implementation by cloud computer system 110. The custom code may implement one or more callable interfaces 250 for cloud computer system 110, which can enable users to access custom services.

Protocol translator 252 may process a message to determine a communication protocol for a message and/or to convert a message to a communication protocol for a destination. Protocol translator 252 may convert a request received from mobile computing devices 202, 212. The request may be converted from a format of a communication protocol supported by computing device 202, 212 to a format of a communication protocol supported by enterprise computer system 282, 292. Protocol translator 252 may convert a response received from enterprise computer system 282, 292. A response may be converted from a format of a communication protocol supported by enterprise computer system 282, 292 to a format of a communication protocol supported by mobile computing device 202, 212. In some embodiments, all or some of the operations performed by protocol translator 252 may be implemented in callable interface 250 and/or adaptor interface 222.

Security service 132 may manage security authentication for requests received from any of mobile computing devices 202, 212. As explained earlier, security service 132 may protect the integrity of customer processes and enterprise data. To prevent the system from being compromised, security authentication may occur when a request is received from mobile computing device 202, 212. Security authentication may be performed before a request is dispatched for processing by cloud computer system 110. The security authentication determined for a user may enable a user associated with a mobile computing device to have authorization to request services via MCS 112. The security authentication may reduce efforts for a user to authenticate for different requests and/or services requested via MCS 112. Security service 132 may be implemented as one or more functional blocks or modules configured to perform various operations authenticating security of a request. Security service 132 may include authentication manager 262, security protocol determiner 264, and security token generator 266.

Authentication manager 262 may manage security authentication for requests received from mobile computing devices 202, 212. Authentication manager 262 may determine security authentication for a user associated with a computing device that sends a request to MCS 112. Security authentication may be determined based on a time period, which may be tied to operation of an app (e.g., launching an app), a request, a computing device, an enterprise computer system, other criterion related to a request, or combinations thereof. Security authentication may be verified and granted for any one of the following, such as an individual request, one or more enterprise computer systems, a particular service, a type of service, a user, a computing device, other criterion for determining security authentication, or combinations thereof. In some embodiments, cloud computer system 110 may store authentication information of users received from enterprise computer systems or authentication systems supporting enterprise computer systems. Cloud computer system 110 may determine authentication by performing a lookup function to determine whether an identity of a user associated with a request has authority to make such a request. The stored authentication information may include information such as the type of requests, functions, enterprise computer systems, enterprise data, or the like that a user may be authorized to access. In some embodiments, cloud computer system 110 may initiate communication with a requesting computing device to determine authentication. Authentication manager 262 may store security authentication information (e.g., authentication information) in cache 220.

In some embodiments, security authentication may be determined based on a role associated with a user requesting a service. The role may be associated with a user requesting access to MCS 112. In some embodiments, a user may request services as a subscriber or tenant of MCS 112 who may be granted access to resources and/or services provided by MCS 112. Authentication may correspond to a user's subscription to MCS, such that a user may be authorized to request services via MCS 112 as a subscriber. In some embodiments, The subscription may be limited to a particular set of resources provided by MCS 112. Security authentication may be based on the resources and/or services accessible to the user of the MCS 112. In some embodiments, a request may be provisioned a template during execution called a "runtime environment." The runtime environment may be associated with resources that are allocated for a request, a user, or a device.

In some embodiments, authentication manager 262 may request an identity management system to determine security authentication for the user. The identity management system may be implemented by cloud computer system 110 or by another computer system that is external to cloud computer system 110. The identity management system may determine security authentication of the user based on the user's role or subscription for accessing MCS 112. The role or subscription may be assigned privileges and/or entitlements with respect to an enterprise computer system, a service provided by an enterprise computer system, a function or feature of an enterprise computer system, other criterion for controlling access to an enterprise computer system, or combinations thereof.

In some embodiments, authentication manager 262 may determine whether a user associated with a request has been authenticated to access a particular enterprise computer system for the request. Authentication manager 262 may determine whether a requested enterprise computer system is one of the enterprise computer systems accessible to the user.

Security protocol determiner 264 may determine a security protocol for requesting services from an enterprise computer system. Cloud computer system 110 may store security protocol information that indicates a security protocol for different enterprise computer systems accessible to cloud computer system 110. In some embodiments, the security protocol information may indicate one or more criteria for selecting a security protocol. Such criteria may include a type of enterprise computer system, a type of request, a type of requestor, type of communication connection, other criterion related to a communication connection between cloud computer system 110 and a requested enterprise computer system, or combinations thereof. In some embodiments, a request may include information used for determining the security authentication of the user and/or the security authentication of the user. Cloud computer system 110 may store information indicating one or more security protocols (e.g., a protocol based on SAML). Security protocol determiner 264 may perform a lookup operation to determine a security protocol for an enterprise computer system.

Security token generator 266 may generate a security token based on security authentication of a user associated with a request. The security token may include security authentication including a level of access, services that can be accessed, and/or other identifying information about a user associated with the security authentication. The security token may be included in a request that is sent to an enterprise computer system to enable the enterprise computer system to verify authentication of a user. The security token may be generated according to a security protocol determined for a requested enterprise computer system.

Figure 3:
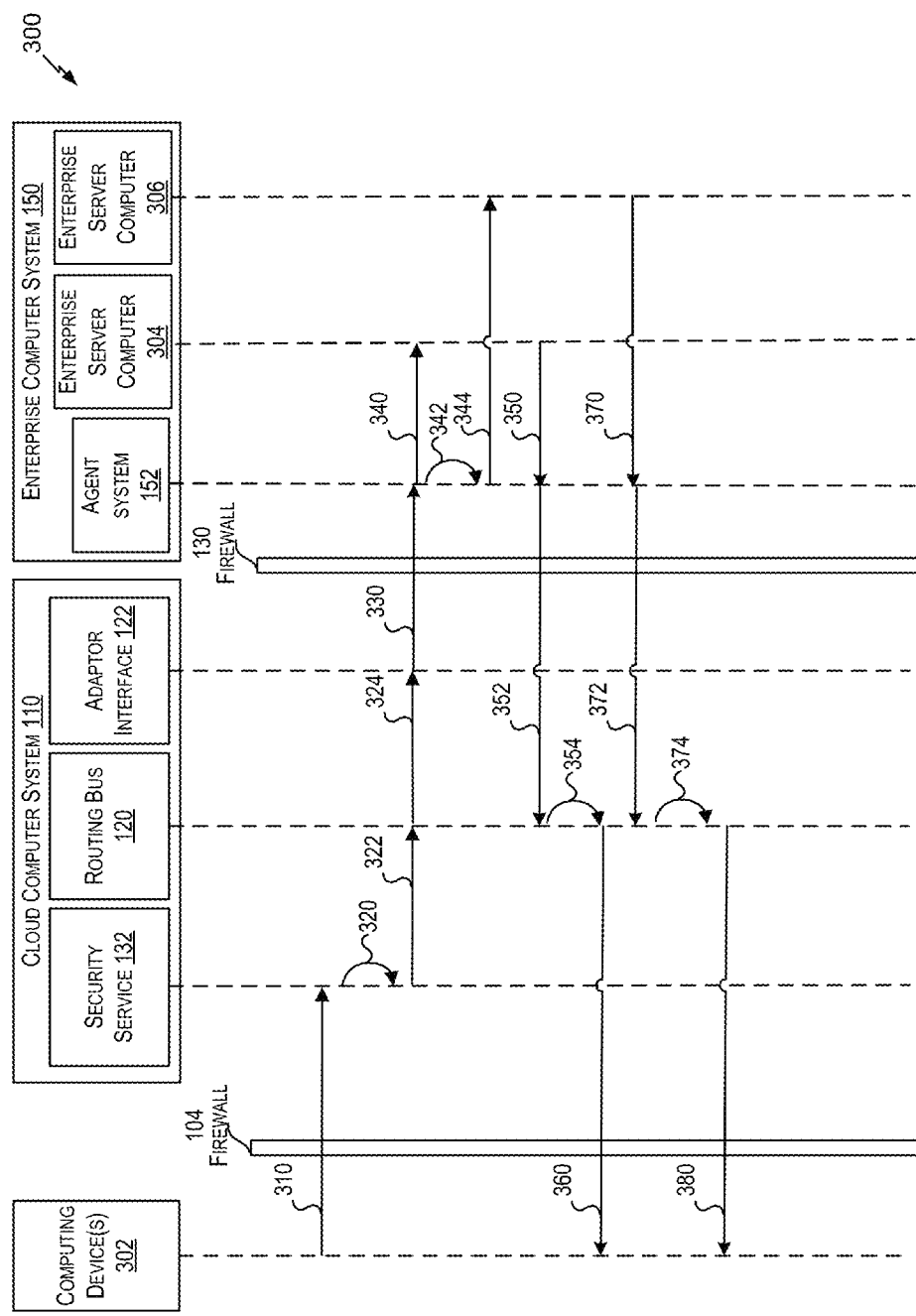
FIG. 3 shows a sequence diagram of a process for facilitating communication between a computing device and an enterprise computer system according to some embodiments of the present invention.

Now turning to FIG. 3, a sequence diagram is shown of a process 300 for facilitating communication between one or more computing devices, e.g., computing device 302, and one or more enterprise computer systems, e.g., enterprise computer system 150, according to some embodiments of the present invention. Communication between computing device 302 and enterprise computer system 150 may be facilitated by a cloud computer system, e.g., cloud computer system 110. In some embodiments, computing device 302, cloud computer system 110, and enterprise computer system 150 may be located at different geographical locations, physically separated from each other. Therefore, computing device 302 can communicate with enterprise computer system 150 regardless of their location. As explained in further detail below, cloud computer system 110 can enable computing device 302 to communicate requests for services to enterprise computer systems, which may support one or more distinct security protocols. In some cases, an enterprise computer system may be supported by a back-end system that is not easily adaptable to a different security protocol. In some cases, it may be desirable for developers of applications to be able to implement an application to be able to request services without knowledge of such security protocols. It may be equally desirable for a user (e.g., an administrator or an architect) of an enterprise computer system to be able to receive requests without accommodating for different types of applications, security protocols, and standards. Process 300 can enable such desires to be met by implementation of cloud computer system 110, which can handle security authentication, such that requests can meet the security measures of different enterprise computer systems, which may be requested.

To beginning process 300, computing device 302 may send enterprise data 310 to cloud computer system 110. The enterprise data may include a request for a service from an enterprise computer system, such as enterprise computer system 150. The enterprise data may be sent for communication to the enterprise computer system. In some embodiments, enterprise data may include multiple requests. Each request may be for the same or a different service. Each requested service may be provided by the same or enterprise computer systems. The enterprise data may include authentication information, such as user identification information, credentials, account information, or the like, some or all of which may be useful for determining security authenticating of a user associated with computing device 302. The enterprise data may include authentication information when a request is sent for the first time to cloud computer system 110 and/or enterprise computer system 150. In some embodiments, enterprise data 310 may include information identifying a requested service and one or more enterprise computer systems that can provide the requested service. Communication between computing device 302 and cloud computer system 110 may be facilitated by use of custom communication protocol 114.

Process 300 may include cloud computer system 110 receiving enterprise data 310. Communication of data 310 may be received through firewall 104, which may provide security to protect internal resources of cloud computer system 110. Cloud computer system 110 may include security service 132, routing bus 120, and adaptor interface 122.

Process 300 may include security service 132 performing one or more operations 320 for enterprise data 310. Security service 132 may initially process a request to determine authentication of a user before further processing is performed. Cloud computer system 110 may store enterprise data 310 in local storage, e.g., cache, of cloud computer system 110. One operation 320 may include determining security authentication for a request for services included in enterprise data 310. Security authentication may be determined for a user associated with computing device 302. Different types of security authentication may be performed. Security authentication may be determined for any one of the following, such as an individual request, one or more enterprise computer systems, a particular service, a type of service, a user, a computing device, other criterion for determining security authentication, or combinations thereof. In some embodiments, security authentication may be determined based on a role associated with a user. Cloud computer system 110 may include determining an enterprise computer system to provide the requested service. In some embodiments, enterprise data 310 may indicate an enterprise computer system. Another operation 320 may include determining whether the security authentication is being determined for the enterprise computer system identified by the request from the user. An operation 320 may include security service 132 storing, in cloud computer system 110, information indicating the security authentication.

In some embodiments, security service 132 may request an identity management system to determine security authentication for the user. The identity management system may be implemented by cloud computer system 110. The identity management system may be implemented by another computer system that is external to cloud computer system 110. The identity management system may determine security authentication of the user based on a role associated with the user when submitting the request. The role may be assigned privileges and/or entitlements with respect to an enterprise computer system, a service provided by an enterprise computer system, a function or feature of an enterprise computer system, other criterion for controlling access to an enterprise computer system, or combinations thereof.

In some embodiments, an operation 320 performed by security service 132 may include identifying enterprise computer systems accessible to a user through cloud computer system 110. The enterprise computer systems may be identified by processing security authentication. To determine whether the user has security authentication to request a service from enterprise computer system 150, process 300 may include security service 132 verifying that a requested enterprise computer system is included in the enterprise computer systems identified as being accessible to a user.

Security service 132 may perform an operation 302 to determine a security protocol for requesting services from a requested enterprise computer system (e.g., enterprise computer system 150). In some embodiments, a request may include information used for determining the security authentication of the user and/or the security authentication of the user. Cloud computer system 110 may store information indicating one or more security protocols (e.g., a protocol based on SAML). A security protocol supported for communication of a request for a service may be chosen based on a type of service requested, an enterprise computer system requested, criterion related to security authentication of the user, or combinations thereof. Security service 132 may determine a security protocol based on information about the requested service including the requested enterprise computer system and a type of service requested.

In some embodiments, enterprise computer system 150 may include agent system 152, which may be located on-premises of an enterprise. Agent system 152 may process (e.g., translate or convert) requests for services to an enterprise computer server computer of an enterprise computer system. Agent system 152 may receive requests from cloud computer system 110 according to a common security protocol regardless of a type of enterprise computer system that is requested for a service. In such embodiments, security service 132 may determine a common security protocol to send the request from a user to the requested enterprise computer system. Cloud computer system 110 may store information indicating a security protocol supported by enterprise computer systems and/or on-premises agent systems that support enterprise computer systems. The common security protocol may be determined based on the enterprise computer system that is requested.

Process 300 may include security service 132 generating a security token for a service requested from an enterprise computer system. The security token may include information about the security authentication of a user that requested a service. As explained above, a requested enterprise computer system may use the generated security token to verify whether a user associated with a request is authorized to request a service. The security token may be generated based on one or more of the following: a security protocol determined for a request, a type of enterprise computer system that is requested, a service that is requested, the security authentication of a user, other criteria based on the requested service, or combinations thereof. In some embodiments, a security token may be generated corresponding to a format corresponding to a security protocol determined for a request. Process 300 may include security service 132 storing the generated security token in cloud computer system 110.

Process 300 may include a request including security authentication information being passed to a dispatcher (e.g., dispatcher 118). Process 300 may include a request being routed 322 to routing bus 120. Routing bus 120 may transfer the request to adaptor interface 122 to process a request for delivery to an enterprise computer system, e.g., enterprise computer system 150, requested for a service. Process 300 may include adaptor interface 122 processing a request to translate the request to a communication protocol supported by enterprise computer system 150.

Process 300 may include sending enterprise data 330 to enterprise computer system 150. Enterprise data 330 may include a request and may be sent using a communication protocol supported by enterprise computer system 150. The request may correspond to a request received from computing device 302. Enterprise data 330 may include enterprise data described above, such as enterprise data stored by cloud computer system 110. Enterprise data 330 may include a security token generated for a request. Enterprise data 330 may include multiple requests, each corresponding to a request received from computing device 302. In some embodiments, enterprise data 330 may include multiple requests selected based on a single request received from computing device 302. When including multiple requests, enterprise data 330 may include a security token corresponding to each request. In the example shown in FIG. 3, enterprise data 330 may indicate multiple requests, each corresponding to a different requested service. Each requested service may be provided by enterprise computer system 150 or other enterprise computer systems accessible to enterprise computer system 150. In some embodiments, enterprise data 330 may be directed to agent system 152. As explained above, agent system 152 may support a common security protocol for handling requests for services. Enterprise data 330 may be formatted according to a common security protocol.

Process 300 may include enterprise computer system 150 receiving enterprise data 330. In some embodiments, enterprise data 330 may be received by agent system 152. Agent system 152 may perform one or more operations upon receiving enterprise data 330. One operation 342 may include storing enterprise data 330 in enterprise computer system 150 or agent system 152. Another operation 342 may include processing enterprise data 330 to determine a requested service. Enterprise data 330 may be converted based on a format corresponding to a protocol supported by enterprise computer system 150.

In some embodiments, another operation 342 performed by agent system 152 may include processing enterprise data 330 to determine a security protocol for a requested service. The security protocol may correspond to a common security protocol supported by agent system 152. Enterprise data 330 may be processed to determine whether a request is presented in a format corresponding to a supported security protocol.

In yet another operation 342, agent system 152 may process enterprise data 330 to determine a security token for a requested service. Enterprise data 330 may be processed to verify authentication of the user based on the security token. Agent system 152 may determine authentication of a user to request the service. Each request in enterprise data 330 may be processed to determine authentication of the user. In some embodiments, agent system 152 may determine authentication for all requests in enterprise data 330 based on a security token included in enterprise data 330. For example, agent system 152 may determine whether authentication information matches authentication information stored by enterprise computer system 150. The authentication information may be compared to authentication information stored by enterprise computer system 150 to determine whether the information matches or satisfies a criterion.

Another operation 342 may include sending enterprise data to one or more enterprise server computers, e.g., enterprise server computer 304 and enterprise server computer 306. Enterprise data 330 received by enterprise computer system 150 may include multiple requests, each directed to a different service provided by a different one of enterprise server computers 304, 306. Enterprise server computer 304 and enterprise server computer 306 may provide a single service or may provide different services. In some embodiments, each of enterprise server computers 304, 306 may facilitate or be associated with one or more other enterprise computer systems. In such embodiments, agent system 152 may be configured to communicate a request to an enterprise computer system via one or both of enterprise server computers 304, 306. In some embodiments, one or more of agent system 152, enterprise server computer 304, and enterprise server computer 306 may be included in a single computer system. Alternatively, one or more of agent system 152, enterprise server computer 304, and enterprise server computer 306 may be included in different computer systems, located in different geographical locations, physically separated from each other.

In one example shown in FIG. 3, agent system 152 may send enterprise data 340 to enterprise server computer 304 for one request and may send enterprise data 344 to enterprise server computer 306 to another request. Enterprise data (e.g., enterprise data 340 or enterprise data 344) sent to an enterprise server computer may include a request formatted to a protocol (e.g., security protocol) supported by the enterprise server computer. Enterprise data 340 and enterprise data 344 may be sent concurrently to enterprise server computer 304 and enterprise server computer 306, respectively.

Process 300 may include enterprise computer system 150 processing one or more responses received from each of enterprise server computers 304, 306. A response may include enterprise data indicating one or more of the following: a response to a request for a service, a result of requesting a service, error information about a requested service, enterprise data for a requested service, other enterprise data to provide a requested service, or combinations thereof. Agent system 152 may manage processing of responses received from enterprise server computers 304, 306. For example, agent system 152 may receive a response 350 from enterprise server computer 304 and may receive a response 370 from enterprise server computer 306. Responses (e.g., response 350 and response 370) may be received concurrently or at different time periods. Responses may be received during different time periods because of a distance a communication travels, network delays, resource for processing a request, time needed for providing a service, or combinations thereof.

In some embodiments, processing responses (e.g., response 350 or response 370) may include converting enterprise data in a response (e.g., response 350 and response 370) to a format supported by cloud computer system 110. The format may correspond to a communication protocol supported by cloud computer system 110. In some embodiments, agent system 152 may perform the conversion process as it may be configured to communicate with cloud computer system 110 on behalf of enterprise computer system 150.

Process 300 may include enterprise computer system 150 sending one or more responses (e.g., response 352 or response 372) to cloud computer system 110. A response may include enterprise data received in a response from an enterprise server computer. The enterprise data may be formatted according to a communication protocol supported by cloud computer system 110. A response may be sent for each response received from an enterprise server computer. For example, response 352 may include enterprise data received from response 350 and response 372 may include enterprise data received from response 370. Enterprise computer system 150 may send a response as responses are received from an enterprise server computer, or a response may include enterprise data received from multiple responses that have been gathered. Such techniques may be useful to minimize communication and/or improve efficiency for communication. In some embodiments, multiple responses may be gathered to receive enterprise data to provide a requested service. As such, enterprise computer system 150 may send multiple responses to cloud computer system 110 to provide enterprise data related to a requested service.

Process 300 may include routing bus 120 processing responses 352, 372 received from enterprise computer system 150. Cloud computer system 110 may perform one or more operations 354, 374 in response to receiving responses 352, 372. One operation may include storing enterprise data received in a response. Another operation may include processing enterprise data received in a response (e.g., response 352 or response 372). Enterprise data received in a response may include a result or notification regarding a requested service. The enterprise data may be processed to identify the result or notification. The enterprise data may be parsed to extract relevant enterprise data for a requested service. In some embodiments, enterprise data received in a response may be compared with existing enterprise data stored on a mobile computing device requesting the service. The differences in the enterprise data may be identified based on the comparison. The differences may be stored and/or communicated to computing device 302. In some embodiments, cloud computer system 110 may determine the enterprise data that can be provided in a response to computing device 302.

Process 300 may include cloud computer system 110 sending one or more responses (e.g., response 360 or response 380) to computing device 302. Response 360 and response 380 may be sent including enterprise data from response 352 and response 372, respectively. In some embodiments, response 360 or response 380 may be sent including enterprise data included in both. In some embodiments, cloud computer system may merge stored enterprise data with enterprise data received in either or both of response 352 or response 372. Response 360 and/or response 380 may include a notification about data 310 originally sent to cloud computer system 110.

Communication between a computing device and an enterprise computer system may be more efficient when conducted through a cloud computer system. Users can communicate with various different types of enterprise computer systems without the computing device having to manage security authentication for different authentication systems supported by different enterprise computer systems. In some instances, security authentication may remain valid for a time period, thereby improving enabling response time to be improved for processing a request because authentication may be eliminated for subsequent requests.

Figure 4:
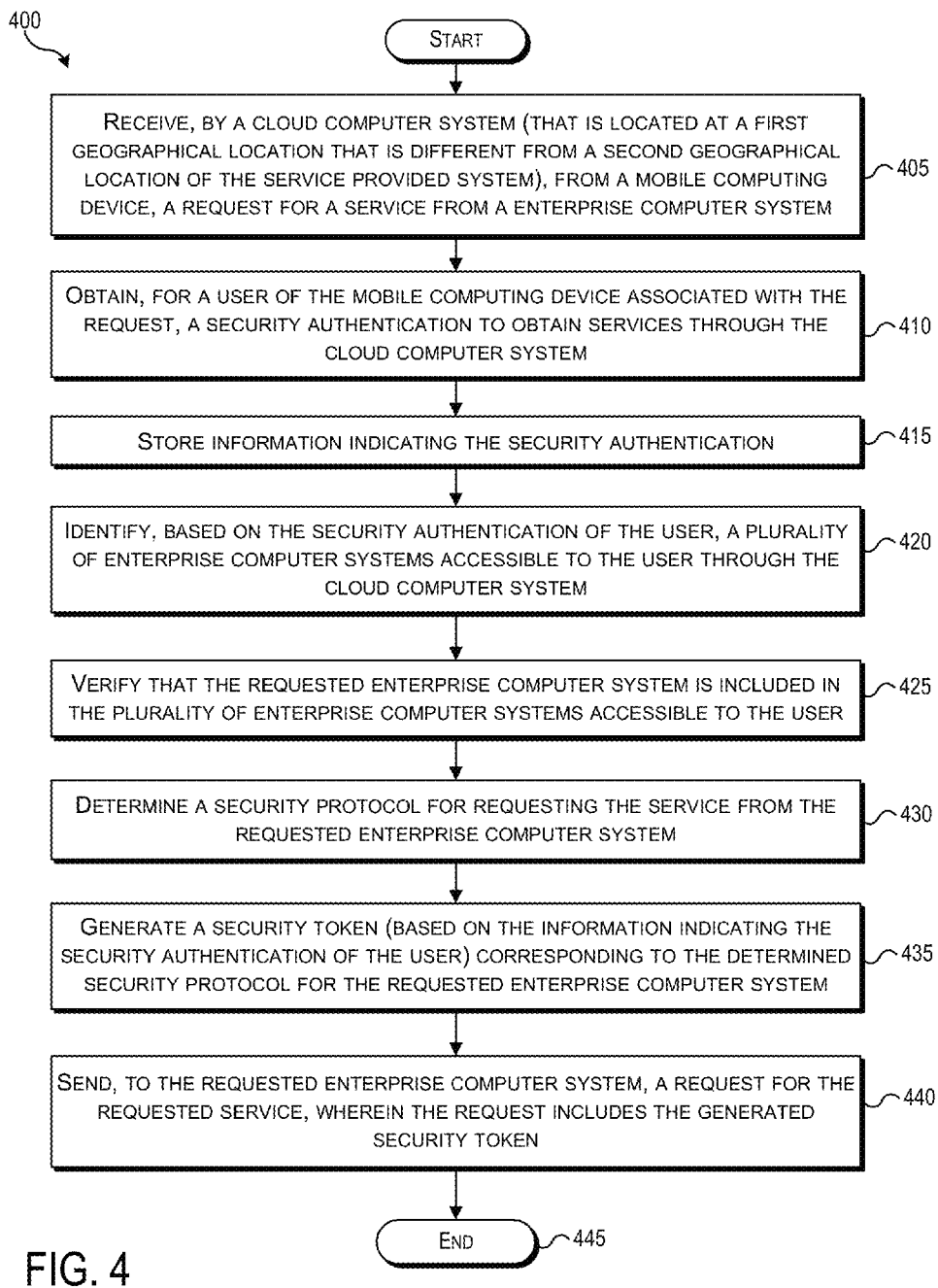
FIG. 4 is a flowchart illustrating a process for facilitating communication between a mobile computing device and an enterprise computer system according to some embodiments of the present invention.

In FIG. 4, a flowchart is shown that illustrates a process 400 for facilitating communication between a mobile computing device and an enterprise computer system according to some embodiments of the present invention. Specifically, process 400 enables a mobile computing device (e.g., a mobile smartphone) to communicate with enterprise computer systems to request services from and/or to exchange enterprise data with the enterprise computer systems. In certain embodiments, process 400 may manage security authentication for a user with respect to accessing one or more enterprise computer systems. In some embodiments, process 400 may enable access to enterprise computer systems based on verification of security authentication for the user. Based on the security authentication of the user, process 400 may communicate security authentication information to a requested enterprise computer system according to a security protocol supported by the enterprise computer system. In some embodiments, using the security authentication of a user managed by the cloud computer systems, process 400 may generate a security token in a manner or format supported by a security protocol of a requested enterprise computer system. Such techniques are described below with reference to FIG. 4. In certain embodiments, a cloud computer system (e.g., cloud computer system 110) may implement process 400.

Process 400 is illustrated as a logical flow diagram, the operation of which represents operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, applications, objects, components, data structures, and the like that perform particular functions or implement particular data types. The order in which the operations are described is not intended to be construed as a limitation, and any number of the described operations may be combined in any order and/or in parallel to implement the processes.

Beginning at block 405, process 400 may include receiving, from a mobile computing device (e.g., computing device 102), a request for a service from an enterprise computer system (e.g., enterprise computer system 150). In some embodiments, the request may include information indicate the service that has been requested, the enterprise computer system requested for the service, enterprise data included in the request, or combinations thereof. The request may be received by a cloud computer system (e.g., cloud computer system 110). Such a cloud computer system may be located at a first geographical location that is different from a second geographical location of the enterprise computer system. The cloud computer system and the enterprise computer system communicate over a public communication network.

At block 410, process 400 may include obtaining, for a user of the mobile computing device associated with the request, a security authentication to obtain at least one service through the cloud computer system. Security authentication may be obtained based on information associated with the user. The request received from the mobile computing device may include user identification information, such as a user's name, contact information (e.g., an address, an email address, or a telephone number), a user identifier, other information identifying the user, or combinations thereof. User identification information may be identified based on information about the mobile computing device determined based on the request. As explained earlier, security authentication may be obtained for a user accessing MCS 112. The authentication may last for a time period tied to a variety of conditions, such as operation of an app on the mobile computing device. In some embodiments, security authentication for a user may be stored in memory (e.g., authentication information 222) after being previously obtained during processing of a request.

At block 415, process 400 may include storing information indicating the security authentication. The information may be stored in a cache of a computing device, e.g., a computing device that performs process 400. The information may include details about the security authentication, such as one or more services a user may be authorized to access from an enterprise computer system, one or more types of services the user is authorized to access from an enterprise computer system, one or more types of enterprise data that can be exchanged with an enterprise computer system, other criterion related to a service provided by an enterprise computer system, or combinations thereof. In some embodiments, the information indicating the security authentication may include a type of enterprise data, a function, or the like, which can be accessed from an enterprise computer system. In some embodiments, the security authentication may indicate a security protocol or standard to use for communication with the requested enterprise computer system. The information may include operations, functions, methods, or the like, which the user may be authorized to access. The information indicating the security authentication may remain stored for a time period. The time period may be based on one or more of the following: use of an application at a computing device associated with the user, operation of an application at a computing device, use of the requested service, sensitivity of enterprise data exchanged for the requested service, a time period for accessing a cloud service, time period for accessing an enterprise computer system, other criterion related to use of the requested service, other criterion related to accessing a cloud service, or combinations thereof. In some embodiments, the information indicating the security authentication may already be stored from a previous request to access the requested enterprise computer system.

At block 420, process 400 may include identifying, based on the security authentication of the user, a plurality of enterprise computer systems accessible to the user through the cloud computer system (e.g., the cloud computer system 110). In some embodiments, the security authentication of the user may permit the user to access any one of the enterprise computer systems accessible through the cloud computer system. In some embodiments, the security authentication of the user may be performed for the enterprise computer systems which may be accessed for the requested service. As explained above, a user's security authentication may be based on that user's role when sending a request for a service. As such, the enterprise computer systems which may be accessible to the user may be tied to those which are accessible to the role of the user. The security authentication may include or be associated with information indicating one or more enterprise computer systems that are accessible to the user.

At block 425, process 400 may include verifying that the enterprise computer system is included in the plurality of enterprise computer systems accessible to the user. Process 400 may verify the enterprise computer system by determining whether an identifier of the enterprise computer system is included in the request and if so, determine whether the identifier corresponding to one of the identified enterprise computer systems. In some embodiments, the request for the service may be processed to determine the requested enterprise computer system. Then process 400 may determine whether the requested enterprise computer system is one of the identified enterprise computer systems.

At block 430, process 400 may include determining a security protocol for requesting the service from the enterprise computer system. In some embodiments, at least one of the plurality of enterprise computer systems may communicate using a different security protocol than a different one of the plurality of enterprise computer systems. The security protocol may be determined based on an enterprise computer system to which communication (e.g., a request for a service) is directed, a type of enterprise computer system requested, a type of service requested, the sensitivity or nature of the request, or combinations thereof. The security protocol may be determined based on a communication protocol for communicating with the requested enterprise computer system, a type of communication connection and/or network used for communication with the requested enterprise computer system, or a combination thereof. In some embodiments, security protocol may be based on an open standard for authentication, such as SAML. The security protocol may be based on one or more protocols or standards for authentication of enterprise data between two systems.

In some embodiments, the security protocol may be a security protocol for enabling access to an agent system (e.g., agent system 152) on premises of an enterprise. An agent system may be configured to receive requests using a security protocol and may communicate a request to an enterprise computer system according to a specific security protocol supported by such a requested enterprise computer system. In such a manner, a cloud computer system can manage authentication for a single security protocol and can avoid having to manage authentication for different security protocols supported by enterprise computer systems.

At block 435, process 400 may include generating a security token corresponding to the determined security protocol for the enterprise computer system. The security token may be generated according to a format or a standard corresponding to the security protocol. For example, the security token may be structured in a format using SAML, which in this example, corresponds to a security protocol based on SAML.

In some embodiments, a security token may be generated based on the information indicating the security authentication of the user. As explained above, security authentication may indicate access permitted to a user. As such, the security token may be generated based on such information which indicates what the user may be permitted to access for the requested service. The security token may include credential information, information about the user, other information related to the user's access for the requested service, or combinations thereof. In some embodiments, the security token may be generated based on a type of service or a function accessible to the user, or other types of limitations for the requested service based on authentication of the user.

At block 440, process 400 may include sending, to the enterprise computer system, a request for the requested service. The request to the enterprise computer system may include the generated security token. In some embodiments, process 400 may send a request for the requested service to an agent system to communicate the request to one or more enterprise computer systems. In some embodiments, a requested service may be provided by a combination of enterprise computer systems. As such, the request may be distributed by the agent system. In some embodiments, a request from the mobile computing device may indicate a plurality of services. In such cases, process 400 may send a request to different enterprise computer systems, each request corresponding to one of the plurality of services. The generated token may be included in each request. Process 400 may end at block 445.

It will be appreciated that process 400 is illustrative and that variations and modifications are possible. Steps described as sequential may be executed in parallel, order of steps may be varied, and steps may be modified, combined, added or omitted. In certain embodiments, process 400 may be implemented when enterprise data is received via a wireless communication connection to a network. For example, process 400 may be performed for each request for a service that is received from a mobile computing device. It should be noted that process 400 can be performed concurrently for requests that are received in multiple communications from a mobile computing device. In certain embodiments, blocks 410 and 415 may be implemented for different security authentication determined for a request. In certain embodiments, blocks 425 and 430 may be implemented for a different enterprise computer system for which a service is requested. As such, blocks 435 and 440 may be performed for each distinct security protocol determined when each enterprise computer system has a different security protocol. Block 440 can be performed for each request to be communicated to a different enterprise computer system.

Figure 5:
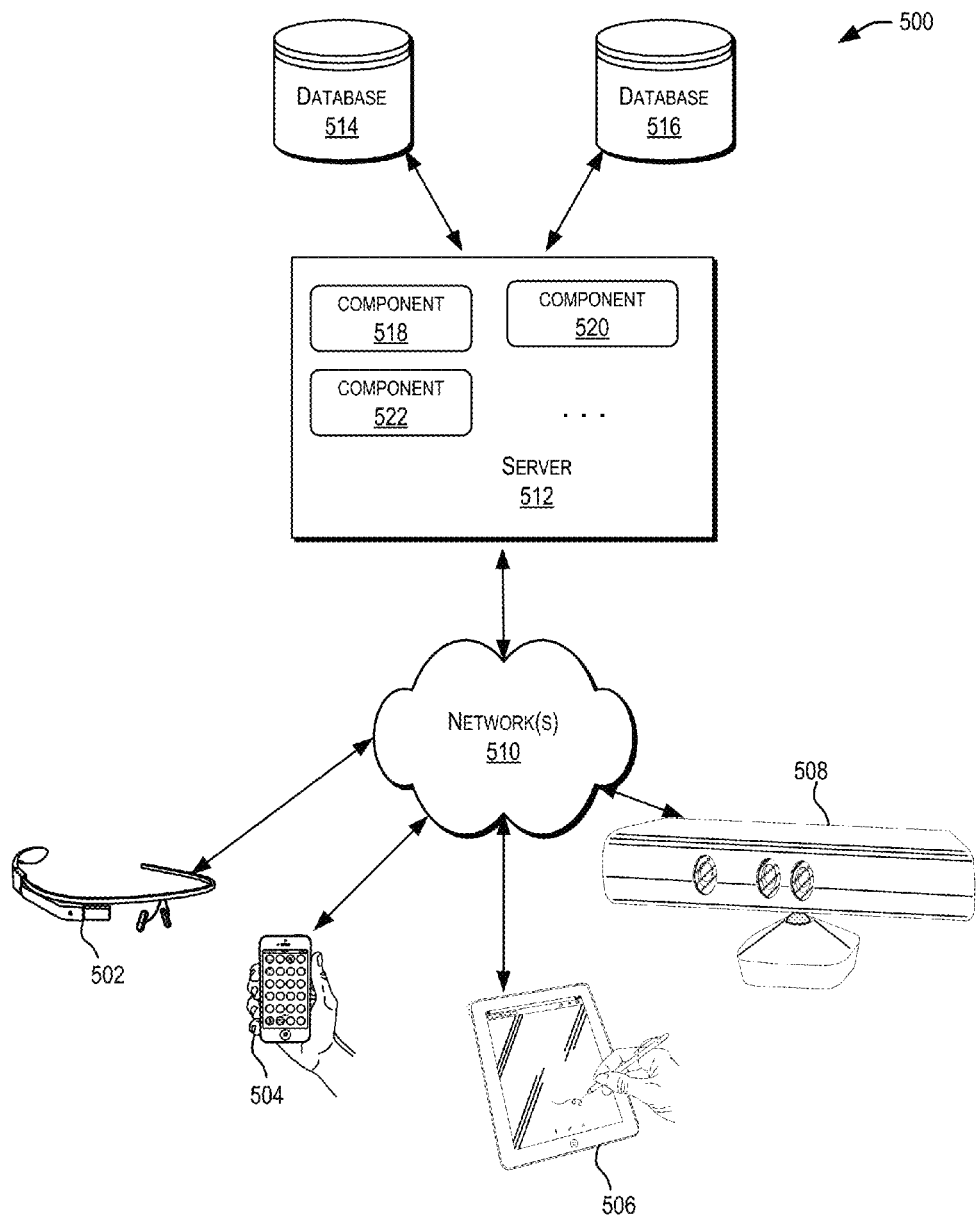
FIG. 5 depicts a simplified diagram of a distributed system for implementing one of the embodiments.

FIG. 5 depicts a simplified diagram of a distributed system 500 for implementing one of the embodiments. The distributed system 500 can implement all or some elements of computing environment 100, all or some elements of computing environment 200, computing device 302, or a combination thereof. The distributed system 500 can implement operations, methods, and/or processes (e.g., process 300 of FIG. 3 and process 400 of FIG. 4). In the illustrated embodiment, distributed system 500 includes one or more client computing devices 502, 504, 506, and 508, which are configured to execute and operate a client application such as a web browser, proprietary client (e.g., Oracle Forms), or the like over one or more network(s) 510. In certain embodiments, the one or more client computing devices 502-508 can include or implement cloud computer system 110 of FIG. 1, computing device 102, or computing device 302. Server 512 may be communicatively coupled with remote client computing devices 502, 504, 506, and 508 via network 510. The server 512 can include computing device 102, cloud computer system 110, or computing device 302.

In various embodiments, server 512 may be adapted to run one or more services or software applications provided by one or more of the components of the system. The services or software applications can include nonvirtual and virtual environments. Virtual environments can include those used for virtual events, tradeshows, simulators, classrooms, shopping exchanges, and enterprises, whether two- or three-dimensional (3D) representations, page-based logical environments, or otherwise. In some embodiments, these services may be offered as web-based or cloud services or under a Software as a Service (SaaS) model to the users of client computing devices 502, 504, 506, and/or 508. Users operating client computing devices 502, 504, 506, and/or 508 may in turn utilize one or more client applications to interact with server 512 to utilize the services provided by these components.

In the configuration depicted in the figure, the software components 518, 520 and 522 of system 500 are shown as being implemented on server 512. In other embodiments, one or more of the components of system 500 and/or the services provided by these components may also be implemented by one or more of the client computing devices 502, 504, 506, and/or 508. Users operating the client computing devices may then utilize one or more client applications to use the services provided by these components. These components may be implemented in hardware, firmware, software, or combinations thereof. It should be appreciated that various different system configurations are possible, which may be different from distributed system 500. The embodiment shown in the figure is thus one example of a distributed system for implementing an embodiment system and is not intended to be limiting.

Client computing devices 502, 504, 506, and/or 508 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 502, 504, 506, and 508 may be any other electronic device, such as a thin-client computer, an Internet-enabled gaming system (e.g., a Microsoft Xbox gaming console with or without a Kinect® gesture input device), and/or a personal messaging device, capable of communicating over network(s) 510.

Although exemplary distributed system 500 is shown with four client computing devices, any number of client computing devices may be supported. Other devices, such as devices with sensors, etc., may interact with server 512.

Network(s) 510 in distributed system 500 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 510 can be a local area network (LAN), such as one based on Ethernet, Token-Ring and/or the like. Network(s) 510 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 512 can include one or more virtual machines running virtual operating systems, or other computing architectures involving virtualization. One or more flexible pools of logical storage devices can be virtualized to maintain virtual storage devices for the server. Virtual networks can be controlled by server 512 using software defined networking. In various embodiments, server 512 may be adapted to run one or more services or software applications described in the foregoing disclosure. For example, server 512 may correspond to a server for performing processing described above according to an embodiment of the present invention.

Server 512 may run an operating system including any of those discussed above, as well as any commercially available server operating system. Server 512 may also run any of a variety of additional server applications and/or mid-tier applications, including HTTP servers, FTP servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 512 may include one or more applications to analyze and consolidate data feeds and/or event updates received from users of client computing devices 502, 504, 506, and 508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 512 may also include one or more applications to display the data feeds and/or real-time events via one or more display devices of client computing devices 502, 504, 506, and 508.

Distributed system 500 may also include one or more databases 514 and 516. Databases 514 and 516 may reside in a variety of locations. By way of example, one or more of databases 514 and 516 may reside on a non-transitory storage medium local to (and/or resident in) server 512. Alternatively, databases 514 and 516 may be remote from server 512 and in communication with server 512 via a network-based or dedicated connection. In one set of embodiments, databases 514 and 516 may reside in a storage-area network (SAN). Similarly, any necessary files for performing the functions attributed to server 512 may be stored locally on server 512 and/or remotely, as appropriate. In one set of embodiments, databases 514 and 516 may include relational databases, such as databases provided by Oracle, that are adapted to store, update, and retrieve data in response to SQL-formatted commands. The one or more databases 514 and 516 can include or be implemented as database 114.

Figure 6:
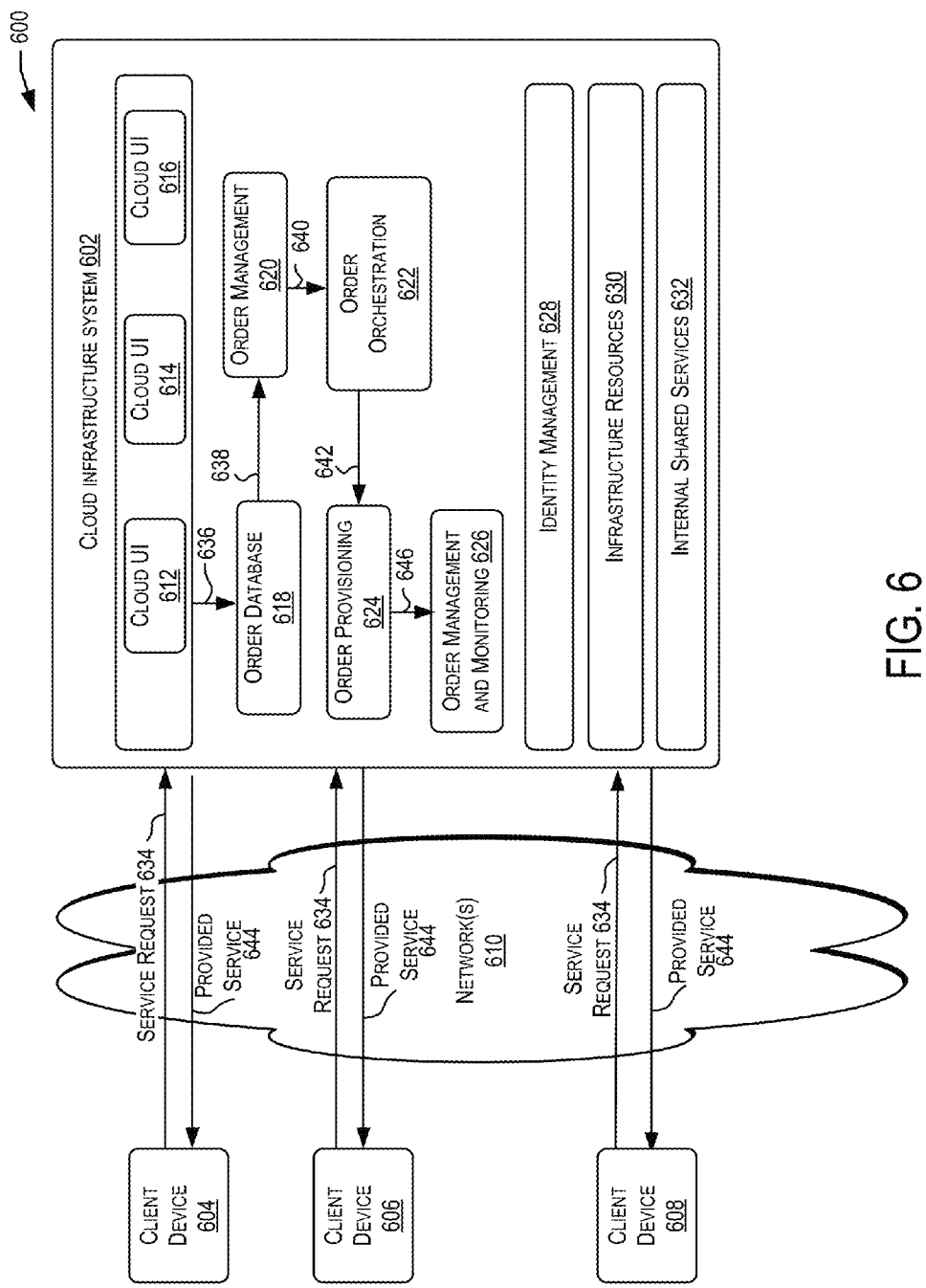
FIG. 6 shows a simplified block diagram of components of a system environment by which services provided by the components of an embodiment system may be offered as cloud services, in accordance with an embodiment of the present disclosure.

FIG. 6 is a simplified block diagram of one or more components of a system environment 600 by which services provided by one or more components of an embodiment system may be offered as cloud services, in accordance with an embodiment of the present invention. The system environment 600 can include or implement all or some elements of computing environment 100, all or some elements of computing environment 200, or a combination thereof. The system environment 600 can implement operations, methods, and/or processes (e.g., process 300 of FIG. 3 or process 400 of FIG. 4). In the illustrated embodiment, system environment 600 includes one or more client computing devices 604, 606, and 608 that may be used by users to interact with a cloud infrastructure system 602 that provides cloud services. The client computing devices may be configured to operate a client application such as a web browser, a proprietary client application (e.g., Oracle Forms), or some other application, which may be used by a user of the client computing device to interact with cloud infrastructure system 602 to use services provided by cloud infrastructure system 602.

It should be appreciated that cloud infrastructure system 602 depicted in the figure may have other components than those depicted. Further, the embodiment shown in the figure is only one example of a cloud infrastructure system that may incorporate an embodiment of the invention. For example, the cloud infrastructure system 602 can include or implement all or part of cloud computer system 110. In some other embodiments, cloud infrastructure system 602 may have more or fewer components than shown in the figure, may combine two or more components, or may have a different configuration or arrangement of components.

Client computing devices 604, 606, and 608 may be devices similar to those described above for client computing devices 502, 504, 506, and 508.

Although exemplary system environment 600 is shown with three client computing devices, any number of client computing devices may be supported. Other devices such as devices with sensors, etc. may interact with cloud infrastructure system 602.

Network(s) 610 may facilitate communications and exchange of data between clients 604, 606, and 608 and cloud infrastructure system 602. Each network may be any type of network familiar to those skilled in the art that can support data communications using any of a variety of commercially-available protocols, including those described above for network(s) 510.

Cloud infrastructure system 602 may comprise one or more computers and/or servers that may include those described above for server 512.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 602 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysis and researchers to visualize large amounts of data, detect trends, and/or otherwise interact with the data. Tens, hundreds, or thousands of processors linked in parallel can act upon such data in order to present it or simulate external forces on the data or what it represents. These data sets can involve enterprise data, structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 602 may be adapted to automatically provision, manage and track a customer's subscription to services offered by cloud infrastructure system 602. Cloud infrastructure system 602 may provide the cloud services via different deployment models. For example, services may be provided under a public cloud model in which cloud infrastructure system 602 is owned by an organization selling cloud services (e.g., owned by Oracle) and the services are made available to the general public or different industry enterprises. As another example, services may be provided under a private cloud model in which cloud infrastructure system 602 is operated solely for a single organization and may provide services for one or more entities within the organization. The cloud services may also be provided under a community cloud model in which cloud infrastructure system 602 and the services provided by cloud infrastructure system 602 are shared by several organizations in a related community. The cloud services may also be provided under a hybrid cloud model, which is a combination of two or more different models.

In some embodiments, the services provided by cloud infrastructure system 602 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 602. Cloud infrastructure system 602 then performs processing to provide the services in the customer's subscription order.

In some embodiments, the services provided by cloud infrastructure system 602 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and can control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 602 may also include infrastructure resources 630 for providing the resources used to provide various services to customers of the cloud infrastructure system. In one embodiment, infrastructure resources 630 may include pre-integrated and optimized combinations of hardware, such as servers, storage, and networking resources to execute the services provided by the PaaS platform and the SaaS platform.

In some embodiments, resources in cloud infrastructure system 602 may be shared by multiple users and dynamically re-allocated per demand. Additionally, resources may be allocated to users in different time zones. For example, cloud infrastructure system 630 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 632 may be provided that are shared by different components or modules of cloud infrastructure system 602 and by the services provided by cloud infrastructure system 602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 602 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 602, and the like.

In one embodiment, as depicted in the figure, cloud management functionality may be provided by one or more modules, such as an order management module 620, an order orchestration module 622, an order provisioning module 624, an order management and monitoring module 626, and an identity management module 628. These modules may include or be provided using one or more computers and/or servers, which may be general purpose computers, specialized server computers, server farms, server clusters, or any other appropriate arrangement and/or combination.

In exemplary operation 634, a customer using a client device, such as client device 604, 606 or 608, may interact with cloud infrastructure system 602 by requesting one or more services provided by cloud infrastructure system 602 and placing an order for a subscription for one or more services offered by cloud infrastructure system 602. In certain embodiments, the customer may access a cloud User Interface (UI), cloud UI 612, cloud UI 614 and/or cloud UI 616 and place a subscription order via these UIs. The order information received by cloud infrastructure system 602 in response to the customer placing an order may include information identifying the customer and one or more services offered by the cloud infrastructure system 602 that the customer intends to subscribe to.

After an order has been placed by the customer, the order information is received via the cloud UIs, 612, 614 and/or 616.

At operation 636, the order is stored in order database 618. Order database 618 can be one of several databases operated by cloud infrastructure system 618 and operated in conjunction with other system elements.

At operation 638, the order information is forwarded to an order management module 620. In some instances, order management module 620 may be configured to perform billing and accounting functions related to the order, such as verifying the order, and upon verification, booking the order.

At operation 640, information regarding the order is communicated to an order orchestration module 622. Order orchestration module 622 may utilize the order information to orchestrate the provisioning of services and resources for the order placed by the customer. In some instances, order orchestration module 622 may orchestrate the provisioning of resources to support the subscribed services using the services of order provisioning module 624.

In certain embodiments, order orchestration module 622 enables the management of business processes associated with each order and applies business logic to determine whether an order should proceed to provisioning. At operation 642, upon receiving an order for a new subscription, order orchestration module 622 sends a request to order provisioning module 624 to allocate resources and configure those resources needed to fulfill the subscription order. Order provisioning module 624 enables the allocation of resources for the services ordered by the customer. Order provisioning module 624 provides a level of abstraction between the cloud services provided by cloud infrastructure system 600 and the physical implementation layer that is used to provision the resources for providing the requested services. Order orchestration module 622 may thus be isolated from implementation details, such as whether or not services and resources are actually provisioned on the fly or pre-provisioned and only allocated/assigned upon request.

At operation 644, once the services and resources are provisioned, a notification of the provided service may be sent to customers on client devices 604, 606 and/or 608 by order provisioning module 624 of cloud infrastructure system 602.

At operation 646, the customer's subscription order may be managed and tracked by an order management and monitoring module 626. In some instances, order management and monitoring module 626 may be configured to collect usage statistics for the services in the subscription order, such as the amount of storage used, the amount data transferred, the number of users, and the amount of system up time and system down time.

In certain embodiments, cloud infrastructure system 600 may include an identity management module 628. Identity management module 628 may be configured to provide identity services, such as access management and authorization services in cloud infrastructure system 600. In some embodiments, identity management module 628 may control information about customers who wish to utilize the services provided by cloud infrastructure system 602. Such information can include information that authenticates the identities of such customers and information that describes which actions those customers are authorized to perform relative to various system resources (e.g., files, directories, applications, communication ports, memory segments, etc.). Identity management module 628 may also include the management of descriptive information about each customer and about how and by whom that descriptive information can be accessed and modified.

Figure 7:
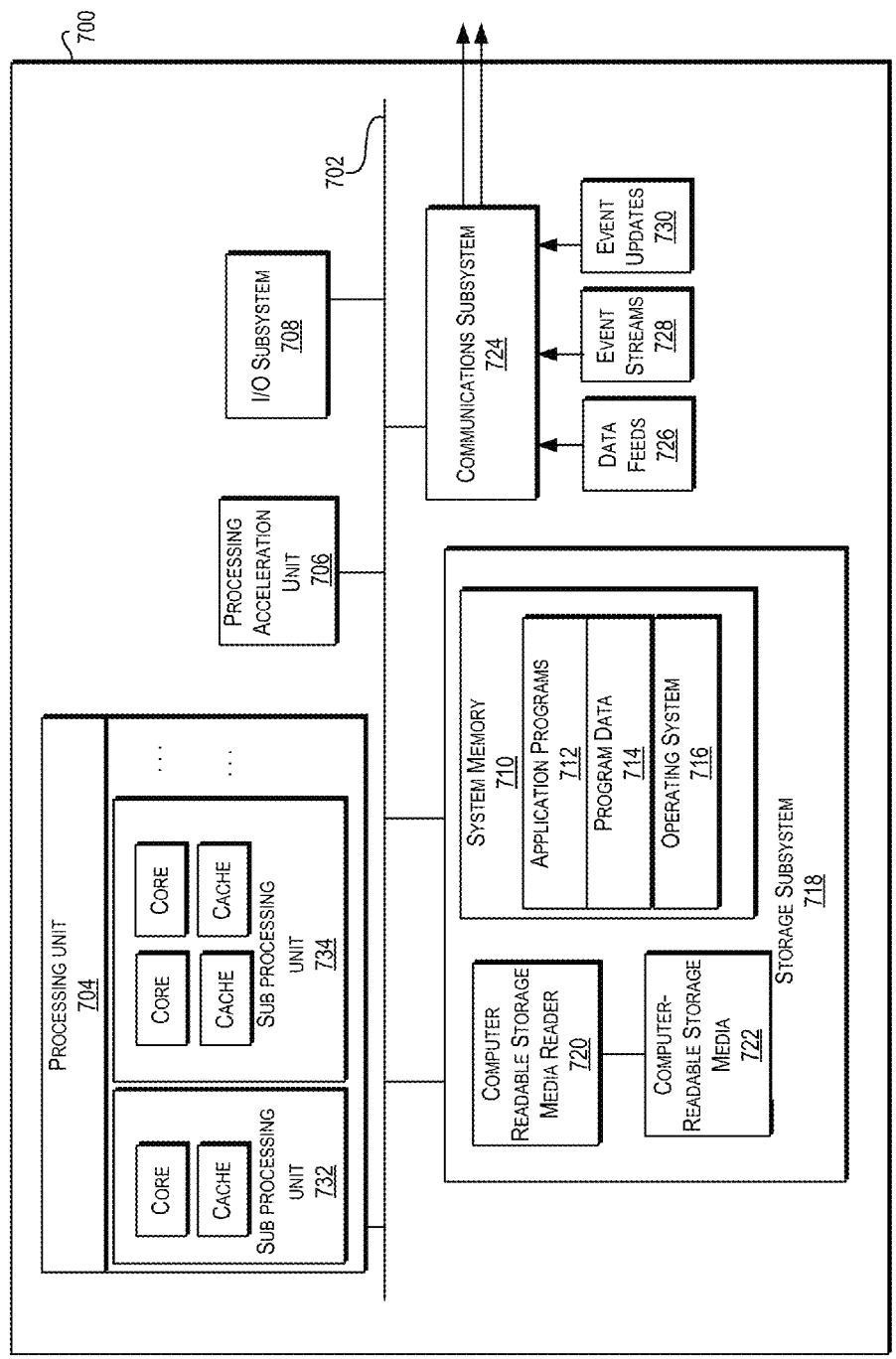
FIG. 7 illustrates an exemplary computer system, in which various embodiments of the present invention may be implemented.

FIG. 7 illustrates an exemplary computer system 700, in which various embodiments of the present invention may be implemented. The system 700 may be used to implement any of the computer systems described above. For example, all or some elements of computer environment 100, all or some elements of computing environment 200, or combinations thereof can be included or implemented in the system 700. The system 700 can implement operations, methods, and/or processes (e.g., process 300 of FIG. 3 or process 400 of FIG. 4). As shown in the figure, computer system 700 includes a processing unit 704 that communicates with a number of peripheral subsystems via a bus subsystem 702. These peripheral subsystems may include a processing acceleration unit 706, an I/O subsystem 708, a storage subsystem 718 and a communications subsystem 724. Storage subsystem 718 includes tangible computer-readable storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 704, which can be implemented as one or more integrated circuits (e.g., a conventional microprocessor or microcontroller), controls the operation of computer system 700. One or more processors may be included in processing unit 704. These processors may include single core or multicore processors. In certain embodiments, processing unit 704 may be implemented as one or more independent processing units 732 and/or 734 with single or multicore processors included in each processing unit. In other embodiments, processing unit 704 may also be implemented as a quad-core processing unit formed by integrating two dual-core processors into a single chip.

In various embodiments, processing unit 704 can execute a variety of programs in response to program code and can maintain multiple concurrently executing programs or processes. At any given time, some or all of the program code to be executed can be resident in processor(s) 704 and/or in storage subsystem 718. Through suitable programming, processor(s) 704 can provide various functionalities described above. Computer system 700 may additionally include a processing acceleration unit 706, which can include a digital signal processor (DSP), a special-purpose processor, and/or the like.

I/O subsystem 708 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 700 may comprise a storage subsystem 718 that comprises software elements, shown as being currently located within a system memory 710. System memory 710 may store program instructions that are loadable and executable on processing unit 704, as well as data generated during the execution of these programs.

Depending on the configuration and type of computer system 700, system memory 710 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 704. In some implementations, system memory 710 may include multiple different types of memory, such as static random access memory (SRAM) or dynamic random access memory (DRAM). In some implementations, a basic input/output system (BIOS), containing the basic routines that help to transfer information between elements within computer system 700, such as during start-up, may typically be stored in the ROM. By way of example, and not limitation, system memory 710 also illustrates application programs 712, which may include client applications, Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 718 may also provide a tangible computer-readable storage medium for storing the basic programming and data constructs that provide the functionality of some embodiments. Software (programs, code modules, instructions) that when executed by a processor provide the functionality described above may be stored in storage subsystem 718. These software modules or instructions may be executed by processing unit 704. Storage subsystem 718 may also provide a repository for storing data used in accordance with the present invention.

Storage subsystem 700 may also include a computer-readable storage media reader 720 that can further be connected to computer-readable storage media 722. Together and, optionally, in combination with system memory 710, computer-readable storage media 722 may comprehensively represent remote, local, fixed, and/or removable storage devices plus storage media for temporarily and/or more permanently containing, storing, transmitting, and retrieving computer-readable information.

Computer-readable storage media 722 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 700.

By way of example, computer-readable storage media 722 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to connect to one or more devices via the Internet. In some embodiments communications subsystem 724 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

In some embodiments, communications subsystem 724 may also receive input communication in the form of structured and/or unstructured data feeds 726, event streams 728, event updates 730, and the like on behalf of one or more users who may use computer system 700.

By way of example, communications subsystem 724 may be configured to receive data feeds 726 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 724 may also be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 724 may also be configured to output the structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 700 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, embodiments of the invention are described with reference to specific embodiments thereof, but those skilled in the art will recognize that the invention is not limited thereto. Various features and embodiments of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
   receiving, by a cloud computer system, from a mobile computing device, a request for a service from an enterprise computer system, wherein the cloud computer system is located at a first geographical location that is different from a second geographical location of the enterprise computer system, wherein the cloud computer system and the enterprise computer system communicate over a public communication network, and wherein the cloud computer system provides an application programming interface (API), the API using a first communication protocol to receive requests for services;
   obtaining, by the cloud computer system, for a user of the mobile computing device associated with the request, a security authentication to obtain at least one service through the cloud computer system;
   storing, by the cloud computer system, information indicating the security authentication;
   identifying, based on the security authentication of the user, by the cloud computer system, a plurality of enterprise computer systems accessible to the user through the cloud computer system, wherein each enterprise computer system of the plurality of enterprise computer systems uses a second communication protocol to receive the requests for services, and wherein the second communication protocol is different from the first communication protocol;
   verifying, by the cloud computer system, that the enterprise computer system is included in the plurality of enterprise computer systems accessible to the user;
   determining, by the cloud computer system, a security protocol for requesting the service from the enterprise computer system;
   generating, by the cloud computer system, a security token corresponding to the determined security protocol for the enterprise computer system, wherein the security token is generated based on the information indicating the security authentication of the user;
   converting the request from a format of the first communication protocol to a different format corresponding to the second communication protocol;
   sending, by the cloud computer system, to the enterprise computer system, the converted request for the service, wherein the converted request includes the generated security token;
   receiving, from the enterprise computer system, a response to the converted request, wherein the response has a format of the second communication protocol used by the enterprise computer system;
   converting the response from the format of the second communication protocol to the format of the first communication protocol; and
   providing the converted response to the mobile computing device.

2. The method of claim 1, wherein at least one of the plurality of enterprise computer systems communicates using a different security protocol than a different one of the plurality of enterprise computer systems.

3. The method of claim 1, wherein the request received from the mobile computing device and the converted request sent to the enterprise computer system conform to different representational state transfer (REST) architectural styles.

4. The method of claim 1, wherein the request received from the mobile computing device includes a first hypertext transfer protocol (HTTP) message and wherein the converted request sent to the enterprise computer system includes a second HTTP message.

5. The method of claim 1, wherein the request received from the mobile computing device includes user identity information of the user.

6. The method of claim 1, further comprising:
   sending an authentication request to an identity management system to determine the security authentication of the user.

7. The method of claim 1, wherein the security token is structured in a format using Security Assertion Markup Language (SAML).

8. The method of claim 1, wherein the plurality of enterprise computer systems includes the enterprise computer system having an on-premises agent system, wherein the on-premises agent system including a plurality of server computers, each server computer of the plurality of server computers providing a different enterprise service, and wherein the on-premises agent system communicates with the cloud computer system over the public communication network.

9. The method of claim 1, wherein the first communication protocol and the second communication protocol conform to a hypertext transfer protocol (HTTP).

10. The method of claim 1, wherein each enterprise computer system of the plurality of enterprise computer systems supports a different second communication protocol for receiving the requests for services.

11. The method of claim 1, wherein the API is configurable by the user of the mobile computing device.

12. The method of claim 1, wherein the cloud computer system includes a database that stores metadata corresponding to one or more configurations of the API.

13. A computer system comprising:
   one or more processors; and
   one or more memory devices coupled to the one or more processors, the one or more memory devices containing instructions, which when executed on the one or more processors, cause the one or more processors to:
      receive, from a mobile computing device using a first communication protocol, a request for a service, wherein the service is provided by an enterprise computer system, wherein the enterprise computer system is located at a first geographical location that is different from a second geographical location of the computer system, and wherein the enterprise computer system and the computer system communicate over a public communication network;

obtain, for a user of the mobile computing device associated with the request, a security authentication to obtain at least one service via the computer system;
store information indicating the security authentication;
identify, based on the security authentication of the user, a plurality of enterprise computer systems accessible to the user through the computer system that provides an application programming interface (API);
verify that the enterprise computer system is included in the plurality of enterprise computer systems accessible to the user;
determine a security protocol for requesting the service from the enterprise computer system;
generate a security token corresponding to the determined security protocol for the enterprise computer system, wherein the security token is generated based on the information indicating the security authentication of the user, and wherein the generated security token is included in a request sent to the enterprise computer system;
convert the request received from the mobile computing device, wherein the request is converted from a first format of the first communication protocol to a second format of a second communication protocol, wherein the second communication protocol is different from the first communication protocol;
send the converted request to the enterprise computer system;
receive, from the enterprise computer system via the second communication protocol, a response to the converted request for the service;
convert the response received from the enterprise computer system, wherein the response is converted from the second format of the second communication protocol to the first format of the first communication protocol; and
send the converted response to the mobile computing device.

14. The computer system of claim 13, wherein the enterprise computer system includes an on-premises agent system, wherein the on-premises agent system is associated with an on-premises local area network of an entity, wherein the on-premises agent system includes a plurality of server computers, each server computer of the plurality of server computers providing a different enterprise service, and wherein the on-premises agent system communicates with the computer system over the public communication network.

15. The computer system of claim 14, further comprising:
a firewall connected with the computer system, wherein an internal network and an external network are separated by the firewall, and wherein the firewall is configured to:
permit communication, conforming to the first communication protocol, between the mobile computing device and the computer system; and
permit communication, conforming to the second communication protocol, between the computer system and the on-premises agent system.

16. A cloud computer system to facilitate communication between a mobile computing device and an on-premises enterprise computer system, the cloud computer system comprising:
a cloud computer device configured to:
receive, through an application programming interface (API), from a mobile computing device, a message conforming to a first format of a first application protocol; and
generate and send, to an agent, a message conforming to a second format of a second application protocol;
a firewall connected with the cloud computer device, wherein an internal network and an external network are separated by the firewall, and wherein the firewall is configured to:
permit communication of messages, conforming to the first format of the first application protocol, between the mobile computing device and the cloud computer device; and
permit communication of messages, conforming to the second format of the second application protocol, between the cloud computer device and the agent; and
a metadata repository connected with the cloud computer device, wherein the metadata repository is configured to store metadata for implementing the API, the implementing including translating between the first format and the second format, and wherein the metadata repository is modifiable by an authenticated user via the external network.

17. The cloud computer system of claim 16, wherein the agent includes a plurality of server computers, each server computer of the plurality of server computers providing a different enterprise service, and wherein the agent communicates with the computer system over a public communication network.

* * * * *

UNITED STATES PATENT AND TRADEMARK OFFICE
CERTIFICATE OF CORRECTION

| | | |
|---|---|---|
| PATENT NO. | : 9,231,946 B2 | |
| APPLICATION NO. | : 14/475285 | |
| DATED | : January 5, 2016 | |
| INVENTOR(S) | : Loo | |

It is certified that error appears in the above-identified patent and that said Letters Patent is hereby corrected as shown below:

In the specification

In column 13, line 53, delete "1180" and insert -- 118 --, therefor.

In column 20, line 18, delete "The" and insert -- the --, therefor.

In column 33, line 22, delete "web site." and insert -- website. --, therefor.

Signed and Sealed this
Sixteenth Day of August, 2016

Michelle K. Lee
*Director of the United States Patent and Trademark Office*